(12) United States Patent
Stammers et al.

(10) Patent No.: US 10,757,538 B1
(45) Date of Patent: Aug. 25, 2020

(54) LOCATION-BASED ENTERPRISE POLICY APPLICATION WITHIN A MOBILE NETWORK

(71) Applicant: Cisco Technology, Inc., San Jose, CA (US)

(72) Inventors: Timothy Peter Stammers, Raleigh, NC (US); Louis Gwyn Samuel, Swindon (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/373,732

(22) Filed: Apr. 3, 2019

(51) Int. Cl.
    *H04W 24/00*     (2009.01)
    *H04W 4/029*     (2018.01)
    *H04W 4/50*     (2018.01)
    *H04W 4/021*     (2018.01)
    *H04W 88/18*     (2009.01)

(52) U.S. Cl.
    CPC ........... *H04W 4/029* (2018.02); *H04W 4/021* (2013.01); *H04W 4/50* (2018.02); *H04W 88/18* (2013.01)

(58) Field of Classification Search
    CPC ....... H04W 4/029; H04W 4/50; H04W 4/021; H04W 88/18; H04W 36/08; H04W 36/24; H04W 12/00516
    See application file for complete search history.

(56) References Cited

U.S. PATENT DOCUMENTS

| | | | |
|---|---|---|---|
| 8,204,477 B2 | 6/2012 | Tenbrook et al. | |
| 8,792,906 B2 | 7/2014 | Batada et al. | |
| 9,336,356 B2 | 5/2016 | Parla et al. | |
| 9,479,512 B2 | 10/2016 | Castro et al. | |
| 9,536,057 B2 | 1/2017 | Das et al. | |
| 2014/0029420 A1* | 1/2014 | Jeong | H04L 12/5692 370/229 |
| 2014/0189785 A1* | 7/2014 | Castro | H04L 63/104 726/1 |

(Continued)

OTHER PUBLICATIONS

3GPP Organizational Partners, "3rd Generation Partnership Project; Technical Specification Group Services and System Aspects; Universal Geographical Area Description (GAD) (Release 15)", 3GPP TS 23.032 V15.1.0, Sep. 2018, 32 pages.

(Continued)

*Primary Examiner* — Charles T Shedrick
(74) *Attorney, Agent, or Firm* — Edell, Shapiro & Finnan, LLC

(57) ABSTRACT

Techniques that provide location-based enterprise policy application within a mobile network are described herein. In one embodiment, a method includes provisioning a location-based enterprise policy within a 3rd Generation Partnership Project (3GPP) mobile network, wherein the location-based enterprise policy comprises one or more mobile network policies configured by an enterprise and the location-based enterprise policy is associated with at least one enterprise device and at least one enterprise site of the enterprise; determining, via the 3GPP mobile network, that the at least one enterprise device is proximate to the at least one enterprise site; and activating, via the 3GPP mobile network, the one or more mobile network policies of the location-based enterprise policy based on the at least one enterprise device being proximate to the at least one enterprise site.

20 Claims, 9 Drawing Sheets

(56) References Cited

U.S. PATENT DOCUMENTS

| | | | | |
|---|---|---|---|---|
| 2014/0199996 A1* | 7/2014 | Wang | ................ | H04W 48/16 |
| | | | | 455/426.1 |
| 2014/0307551 A1* | 10/2014 | Forssell | ............ | H04W 48/16 |
| | | | | 370/235 |
| 2015/0173008 A1* | 6/2015 | Siddam | ............ | H04W 48/18 |
| | | | | 455/434 |
| 2016/0191512 A1* | 6/2016 | Tatourian | ......... | H04L 63/0861 |
| | | | | 726/7 |
| 2017/0135113 A1* | 5/2017 | Vanscoyk | ........... | H04W 4/025 |

OTHER PUBLICATIONS

Harman International., "Harman Spark", https://car.harman.com/solutions/smart-auto/harman-spark, downloaded Apr. 2, 2020, 6 pages.

VMware, Inc., "Enforcement", Oct. 18, 2018, 5 pages.

IBM, "IBM Support", https://www.ibm.com/support/pages/support-location-based-policies-offline-devices-and-wifi-proxy, Nov. 9, 2018, 2 pages.

Harman International., "Harman Spark + Quick Start Guide", QSG Part No. - 3578763, downloaded Apr. 2, 2020, 2 pages.

* cited by examiner

US 10,757,538 B1

LOCATION-BASED ENTERPRISE POLICY APPLICATION WITHIN A MOBILE NETWORK

TECHNICAL FIELD

The present disclosure relates to a communication system for location-based enterprise policy application within a mobile network.

BACKGROUND

Mobile networking architectures have grown increasingly complex. As the number of mobile subscribers increases, efficient management of communication resources becomes more critical. In particular, management of different policies associated with mobile devices is difficult when multiple networks overlap in a communication system. Accordingly, there are significant challenges in managing mobile network architectures.

DESCRIPTION OF EXAMPLE EMBODIMENTS

Overview

Figure 1:
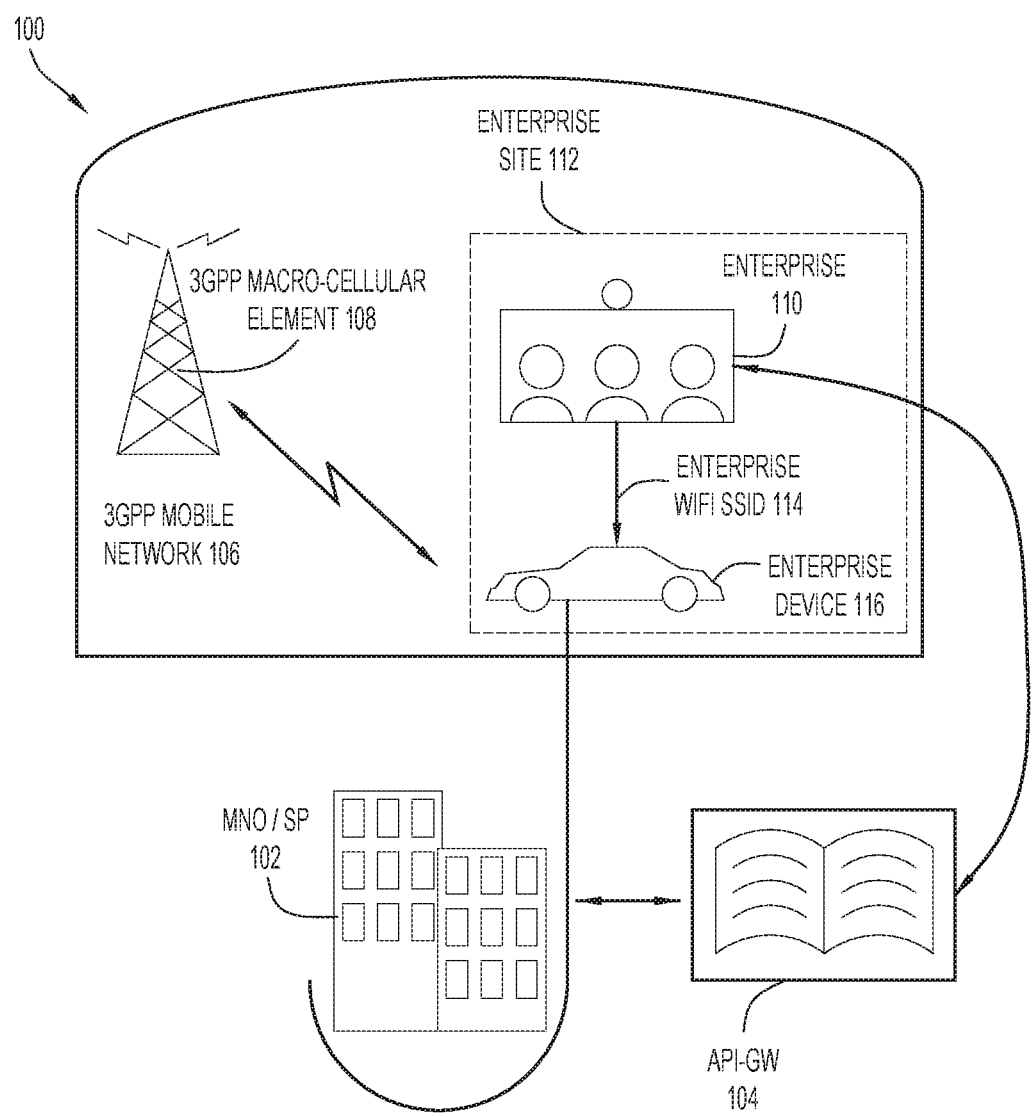
FIG. 1 is a conceptual illustration of a system in which techniques that provide for location-based enterprise policy application within a mobile network may be implemented, according to an example embodiment.

Presented herein are techniques to provide enterprise policy application using mobile networks. A computer-implemented method is provided in one example embodiment and may include provisioning a location-based enterprise policy within a 3rd Generation Partnership Project (3GPP) mobile network, wherein the location-based enterprise policy comprises one or more mobile network policies configured by an enterprise and the location-based enterprise policy is associated with at least one enterprise device and at least one enterprise site of the enterprise; determining, via the 3GPP mobile network, that the at least one enterprise device is proximate to the at least one enterprise site; and activating, via the 3GPP mobile network, the one or more mobile network policies of the location-based enterprise policy based on the at least one enterprise device being proximate to the at least one enterprise site. The provisioning may include provisioning the location-based enterprise policy for a policy server within the 3GPP mobile network.

In some instances, determining that the enterprise device is proximate to the at least one enterprise site may include receiving a notification from the enterprise device comprising one or more enterprise service set identifiers (SSIDs) detected by the enterprise device; and determining that at least one of the one or more enterprise SSIDs is associated with the location-based enterprise policy. In still some instances, determining that the enterprise device is proximate to the at least one enterprise site may include receiving a notification from the enterprise device comprising an indication that the enterprise device has detected one or more enterprise service set identifiers (SSIDs); and determining that the enterprise device is assigned to the location-based enterprise policy.

The one or more mobile network policies may include one or more of: a cellular data limit rule to be applied to a session of the enterprise device when the enterprise device is proximate to the at least one enterprise site; a cellular throughput limit rule to be applied to a session of the enterprise device when the enterprise device is proximate to the at least one enterprise site; a threat protection rule to be applied to a session of the enterprise device when the enterprise device is proximate to the at least one enterprise site; and a sleep/awake cycle rule to be applied to a session of the enterprise device when the enterprise device is proximate to the at least one enterprise site.

In some instances, activating the one or more mobile network policies of the location-based enterprise policy may include sending a notification to the enterprise device for triggering activation of at least one mobile network policy for one or more applications of the enterprise device. Triggering activation of the at least one mobile network policy for the one or more applications of the enterprise device may include modifying operations of at least one application of the enterprise device.

In some instances, the method may further include notifying the enterprise that the enterprise device is proximate to the at least one enterprise site. In some instances, after notifying the enterprise that the enterprise device, the method may further include receiving enterprise inputs associated with updating at least one mobile network policy of the one or more mobile network policies based on the notifying; and updating the at least one of the one or more mobile network policies based on the enterprise inputs.

In some instances, the method may further include monitoring a location of the enterprise device in proximity to the at least one enterprise site following the activating. Based on the monitoring, the method may further include determining that the enterprise device is not proximate to the at least one enterprise site; and deactivating the one or more mobile network policies of the location-based enterprise policy.

Example Embodiments

For purposes of understanding certain embodiments of systems and architectures disclosed herein, it is important to appreciate the technologies and data that may be associated with network communications for 3rd Generation Partnership Project (3GPP) mobile network architectures, such as Long Term Evolution (LTE) Evolved Packet Core (EPC) mobile network architectures, sometimes referred to as 4th Generation (4G)/LTE architectures, as well as 3GPP 5th Generation (5G) mobile network architectures. The following foundational information may be viewed as a basis from which the present disclosure may be properly explained.

Architectures that facilitate network communications generally rely upon three basic components: a data or user plane, a control plane, and a management plane. Typically, the user plane carries data traffic (e.g., user data traffic), while the control plane and the management plane serve the data plane. As referred to herein and in the claims, the term 'plane' can refer to a separation of traffic, operations, etc. for a network and/or network element or node.

Compute node(s) having hardware, software, and/or networking resources that can be abstracted into one or more logical layers can be used to facilitate building and deploying Software Defined Network (SDN) architectures for virtualized network environments. Generally, SDN architectures provide an approach to building and deploying computer networks, networking equipment, and software that separates and abstracts the control plane and user plane of networking systems. SDN decouples the control plane that makes decisions about where traffic is sent from the underlying user plane that forwards traffic to a selected destination. SDN allows network administrators, operators, etc. to manage network services through abstraction of lower level functionality into a virtualized network environment. In various embodiments, a compute node can include, but not be limited to: a data center compute node such as a server, rack of servers, multiple racks of servers, etc. for a data center; a cloud compute node, which can be distributed across one or more data centers; among others.

As referred to herein in this disclosure, the terms 'virtual machine', 'virtualized network function', 'virtualized network functionality', 'virtualized network architecture', and variations thereof can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality and/or any virtualized network controller, element, module, aggregator, combinations thereof or the like as described herein may execute (e.g., be instantiated to perform one or more operation(s)) via a hypervisor-based virtualization or a container-based virtualization of one or more compute node(s) using the compute node(s)' hardware (e.g., processor, memory, network interfaces, etc.), software and/or operating system for a given virtualized network environment.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual, or script data or information or any type of source or object code, or any other suitable data or information in any appropriate format that can be communicated from one point to another using electronic devices and/or networks. Additionally, messages, requests, responses, replies, queries, etc. are forms of network traffic and, therefore, may comprise one or more packets.

Communications in a network environment can be sent and received according to any suitable communication protocols. Suitable communication protocols can include a multi-layered scheme such as the Open Systems Interconnection (OSI) Model, or any derivations or variants thereof. As referred to herein and in the claims, the terms 'packet' and 'data packet' may be used interchangeably. Within a network architecture or environment, Internet Protocol (IP) addresses for any element in the network environment can be assigned using Dynamic Host Configuration Protocol (DHCP), Stateless Address Auto-configuration (SLAAC), during default bearer activation processes, etc., or any suitable variation thereof. IP addresses discussed herein and in the claims can include IP version 4 (IPv4) and/or IP version 6 (IPv6) addresses.

In traditional 3GPP 4G mobile network architectures, user equipment (UE) devices typically connect to a service provider mobile packet core (e.g., 4G EPC) network through over-the-air communications with one or more radio nodes such as evolved Node Bs (eNodeBs or eNBs) for a 3GPP Radio Access Network (RAN), which interface with control plane elements such as Mobility Management Entities (MMES) and user plane elements such as Serving Gateways (SGWs) and Packet Data Network (PDN) Gateways (PGWs). Policy and charging elements, such as Policy and Charging Rules Functions (PCRFs) may also be provided.

In traditional 3GPP 4G mobile network architectures, user plane elements such as SGWs can route and forward user data packets while also acting as a mobility anchor for inter-3GPP mobility (e.g., handling mobility interfacing to other networks such as 2nd Generation (2G) and/or 3rd Generation (3G) networks) and during inter-eNodeB handoffs or handovers. Further, PGWs may provide UE connectivity to external PDNs, such as the Internet, an IP Multimedia Subsystem (IMS), combinations thereof, or the like. A PGW can serve as a policy enforcement point to manage Quality of Service (QoS), flow classification, online/offline flow-based charging, data generation, shallow packet inspection, deep packet inspection (DPI), packet filtration, intercept, combinations thereof or the like. Control plane elements such as MMEs can provide tracking area list management, idle mode UE tracking, bearer activation and deactivation, SGW and PGW selection for user equipment sessions, authentication services, etc. PCRFs can support the creation/installation/etc. of policy and charging control (PCC) rules and make policy and/or charging decisions for each of a respective subscriber associated with each of a respective user equipment session for various elements data plane elements.

In some cases, software defined network (SDN) concepts can be applied to a traditional 3GPP 4G architecture to enable separation of the control and user planes in order to implement a 3GPP Control and User Plane Separation (CUPS) mobile network architecture in which the control and user paths are split across the two planes thereby creating a control plane (CP) implemented via one or more controller element(s) and a user plane (UP) implemented via one or more forwarding element(s) (FE(s)). For a 3GPP 4G CUPS architecture, control plane VNFs can include any number of MMEs, control plane SGWs (referred to herein as SGW-Cs), and control plane PGWs (referred to herein as PGW-Cs) that manipulate the user plane network infrastructure to facilitate end-to-end service provider network connectivity. Also for a 3GPP 4G CUPS architecture, the user plane (UP) FE(s) (e.g., VNFs) can include any number of user plane SGWs (referred to herein as SGW-Us) and user plane PGWs (referred to herein as PGW-Us) that can process and perform operations on subscriber (e.g., UE) traffic as the traffic passes through the service provider network. In some embodiments, functionality for the SGWs and PGWs can be combined to provide System Architecture Evolution Gateways (SAEGWs), which can be implemented in a CUPS architecture as control plane SAEGWs (referred to herein as SAEGW-Cs) and user plane SAEGWs (referred to herein as SAEGW-Us). Together, the control plane and user plane elements can manage the forwarding of all subscriber traffic through a service provider network.

SDN concepts also provide a foundation upon which 3GPP 5G mobile network architectures and other next generation (nG) mobile network architectures may be implemented. Various VNFs that may be provided for a 5G mobile network architecture may include control plane elements such as an Access and Mobility Function (AMF) and a Session Management Function (SMF), and user plane elements such as User Plane Functions (UPFs), as defined in 3GPP standards. Generally, the AMF provides authentication, authorization, and mobility management for mobile devices, while the SMF is generally responsible for session management with individual functions being supported on a per-session basis in which the SMF allocates IP addresses to mobile devices, and selects and controls the UPFs for data transfer. The SMF also acts as the external point for all communication related to the various services offered and enabled in the user plane and how the policy and charging treatment for these services is applied and controlled. Other control plane elements may be implemented, as defined in 3GPP standards. The UPFs may operate as Virtualized Network Functions (VNFs) to serve as forwarding engines for user traffic and may perform a variety of functions such as shallow packet inspection, DPI, traffic optimization and inline services such as Network Address Translation (NAT)/Firewall/Domain Name System (DNS) snooping, QoS, among others.

In some cases, enterprises may wish to apply access, security profile, segmentation, and/or any other enterprise policies in which the enterprise policies may take into account whether an endpoint (e.g., an enterprise device) is located 'on' a campus of an enterprise. While 3GPP macro-cellular access network location may be used to generally determine the location of a device connected to the access network, macro-cellular location alone cannot provide the level of identification that may be needed to apply enterprise policies when enterprise devices are within proximity of an enterprise site.

Example embodiments described herein provide techniques to overcome these hurdles by providing for the ability to facilitate applying enterprise policies to enterprise devices using a 3GPP mobile network based on enterprise site identification that combines macro-cellular location with detected enterprise networks.

Referring to FIG. 1, FIG. 1 is a conceptual illustration of a system 100 in which techniques that provide for location-based enterprise policy application within a 3GPP mobile network 106 may be implemented, according to an example embodiment. In at least one embodiment, system 100 may include mobile network operator/service provider (MNO/SP) 102, an application programming interface (API) gateway (API-GW) 104 operated by MNO/SP 102, 3GPP mobile network 106 operated by MNO/SP 102 that includes a 3GPP macro-cellular element 108, an enterprise 110, an enterprise WiFi Service Set Identifier (SSID) 114 broadcast by an enterprise WiFi access point (AP) (not shown) associated with an enterprise site 112 of enterprise 110, and an enterprise device 116 associated with enterprise 110. In at least one embodiment, enterprise device 116 may be any mobile device, user equipment (UE), connected vehicle (as illustrated in the embodiment of FIG. 1), or the like configured with one or more Radio Frequency (RF) transceivers, hardware, and software that is capable of connecting to one or more over-the-air (OTA) accesses, such as 3GPP macro-cellular element 108 and the enterprise WiFi AP.

In a macro-cellular network, per-session mobile network policies are applied. Typically there are sets of mobile network policies for a given class of use case say, for example, consumer, Internet of Things (IoT), First Responder, etc. In various embodiments, these mobile policies may cover a variety of aspects such as permitted application connectivity, throughput limits, data volumes, sleep/awake cycles, threat protection rules, and so on.

In accordance with embodiments described herein, MNO/SP 102 can expose to enterprise 110 various macro-cellular network policies or, more generally, mobile network policies that are enforceable, per-session, within 3GPP mobile network 106. For example, MNO/SP 102 can provision mobile network policies that are to be applied across a use case (or cases) for one or more services that may be provided for each use case(s).

Mobile network policies may be associated with mobile network services that may be provided to subscribers (e.g., enterprise device 116) via a mobile network (e.g., 3GPP mobile network 106). In various embodiments, mobile network policies can include standards-based policies associated with standards-based services (e.g., based on 3GPP standards, Internet Engineering Task Force (IETF) standards, European Telecommunications Standards Institute (ETSI) standards, etc.), MNO/SP policies associated with MNO/SP services (e.g., for over-the-top (OTT) services, value-added services, etc. provided by MNO/SP 102), third-party policies associated with third-party applications/services (e.g., OTT services, value-added services, etc. that may be provided by a third-party applications/services), assurance data policies (e.g., to provide assurance data to the enterprise 110 for one or more service level agreements (SLAs) associated with contracted policies/services), combinations thereof, and/or any other policies that may be envisioned for a 3GPP mobile network.

The enterprise 110 can contract to use the services offered by a given use case (e.g., a Network-As-A-Service approach). One of these services may include a 'proximity-triggered' enterprise policy application service. Thereafter, the MNO/SP 102 may expose the mobile network policies for the proximity-triggered enterprise policy application service via API-GW 104.

Using an API that facilitates communications between enterprise 110 and MNO/SP 102, enterprise 110 may be permitted to populate data from allowed sets, ranges etc. to tailor or customize (e.g., configure) the given use case without impacting the underlying integrity of 3GPP mobile network 106. Customization may include identifying enterprise devices (e.g., enterprise device 116) for which the proximity triggered enterprise policy application service is to be applied via 3GPP mobile network 106. In some embodiments, customization may also include identifying one or more enterprise sites at which the service is to be applied. In various examples, enterprise sites may be identified using enterprise SSIDs broadcast at various sites and/or physical geographic locations associated with enterprise sites. In some embodiments, this can be further divided to be policies that differ by groups of one or more enterprise sites. Other data may be customized for the service, as discussed in further detail herein. Thus, enterprise 110 can customize one or more mobile network policies within 3GPP mobile network 106 that are contingent on endpoint presence 'on-site' (e.g., proximate to the geographic location of enterprise site 112) or not.

As referred to herein, mobile network policies that can be tailored or otherwise customized by an enterprise may be referred to as 'composite SP+Enterprise' policies or, more generally, as 'location-based' enterprise policies. Further as referred to herein, the term 'endpoint' may generally refer to any enterprise device that may be associated with a location-based enterprise policy.

Consider an example involving enterprise device 116, which may be a 'branch-office-in-motion' (e.g., a connected vehicle) with its own internal enterprise network that has Wide Area Network (WAN)-like connectivity via 3GPP mobile network 106.

Enterprise 110 may have a priori data populated via API-GW 104 that includes a location-based enterprise policy, which is configured at a policy server within a mobile core of MNO/SP mobile network 106. In some embodiments, the a priori data may include, but not be limited to, identification of the enterprise WiFi SSID 114 broadcast by the enterprise WiFi AP that is operating at enterprise site 112 and identification of the enterprise device 116 in association with the location-based enterprise policy that is to be applied to the enterprise device 116 at the enterprise site 112. Other data may be configured for a location-based policy, as discussed herein.

During operation, enterprise device 116 may be registered (via 3GPP macro-cellular element 108) with 3GPP mobile network 106 for a 3GPP session handled by 3GPP mobile network 106. The location-based enterprise policy may be applied to the enterprise device 116 session via the policy server.

The geographic location of 3GPP macro-cellular element 108 within mobile network 106 is known to MNO/SP 102. Thus, enterprise device 116 location to the cell level can be determined from the 3GPP macro-cellular network via 3GPP macro-cellular element 108 and the 3GPP mobile network 106. This can be used to place a device in the general proximity of an enterprise site (e.g., enterprise site 112). For example, it is known to the MNO/SP 102 that the 3GPP macro-cellular coverage for 3GPP macro-cellular element 108 includes the specific enterprise site 112.

Upon moving within proximity of enterprise site 112, enterprise device 116 can detect which WiFi SSIDs are being broadcast in the geographic area in which it may be located. For example, the enterprise WiFi SSID 114 broadcast by the enterprise WiFi AP is visible to enterprise device 116 such that detection of an SSID 'owned' by the enterprise 110 implies that the enterprise device 116 is on or very close to enterprise site 112.

In at least one embodiment, the enterprise device 116 may report the enterprise SSID to MNO/SP 102 (e.g., 3GPP mobile network 106) directly via 3GPP macro-cellular element 108, which causes the location-based enterprise policy corresponding to enterprise site 112 and enterprise device 116 to be triggered at MNO/SP 102 by the policy server. In another embodiment, the enterprise device 116 may send a notification via 3GPP macro-cellular element 108 and 3GPP mobile network 106 that the enterprise SSID has been detected.

Upon receiving a report of the detected enterprise SSID or a notification that the enterprise SSID has been detected, the policy server may cause one or more policy related actions to be performed. In some embodiments, the one or more policy related actions may include triggering activation of one or more mobile network policies configured for location-based enterprise policy that are to be applied via 3GPP mobile network 106 to the enterprise device 116 at enterprise site 112. For example, certain policies may be activated when enterprise device 116 is proximate to enterprise site 112 and then de-activated when enterprise device 116 moves away from enterprise site 112. In still some embodiments, the one or more policy related actions may include notifying enterprise 110 that enterprise device 116 is on or very close to enterprise site 112. Based on the notification, enterprise may request, modify, and/or remove one or more mobile network policies that may be associated with the location-based enterprise policy that is contingent on endpoint presence 'on-site' or not.

In this example, when the vehicle is determined to be in the proximity of a dealership say, or another facility of the enterprise with policy management rights for that vehicle, policies within that vehicle could be activated. Activation of the policies within the vehicle could, for example, permit certain applications to execute in the vehicle environment that only make sense in the enterprise site proximity case. Example applications may include customer care applications, applications associated with vehicle health and diagnostic information, applications associated with dealership-specific offering notifications, and so on.

Thus, embodiments herein provide techniques in which proximity of an enterprise device to an enterprise site whilst registered on the macro cellular network can be inferred by a combination of macro cellular location plus an indication of nearby enterprise connectivity, (e.g. detection of enterprise WiFi SSIDs). Using techniques provided by embodiments herein, consistent enterprise policy application across enterprise devices that is dependent on site proximity may be possible while an enterprise device is connected via macro-cellular technology.

Figure 2:
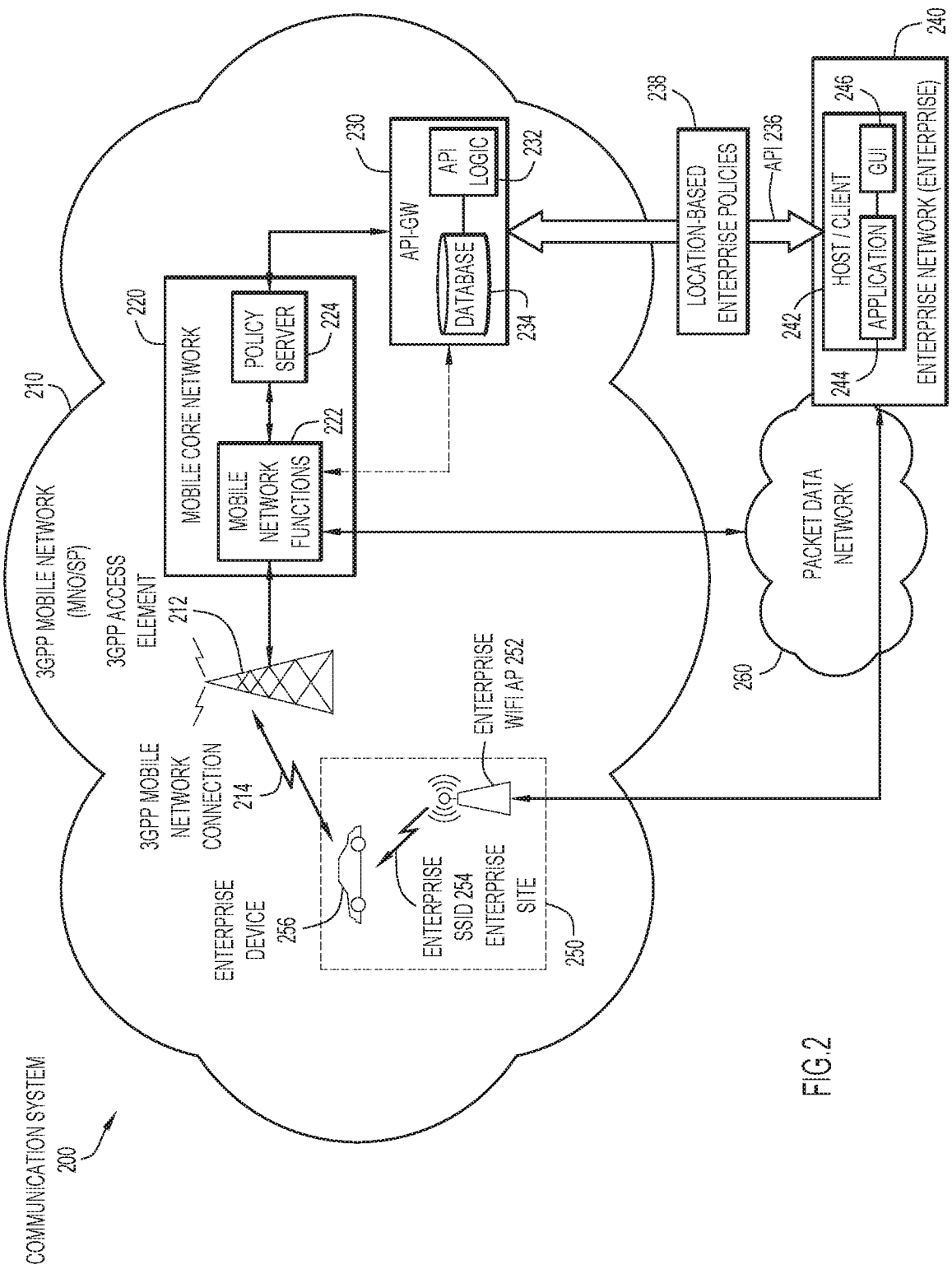
FIG. 2 is a simplified block diagram illustrating example details associated with a communication system in which techniques that provide for location-based enterprise policy application within a mobile network may be implemented, according to an example embodiment.

Referring to FIG. 2, FIG. 2 is a simplified block diagram illustrating example details associated with a communication system 200 in which techniques that provide for location-based enterprise policy application within a 3GPP mobile network 210 may be implemented, according to an example embodiment. In at least one embodiment, communication system 200 may include 3GPP mobile network 210, an enterprise network 240, and a packet data network (PDN) 260. 3GPP mobile network 210 may be operated by/associated with an MNO/SP and enterprise network 240 may be operated by/associated with an enterprise. In some instances, PDN 260 may be any PDN such as the Internet, an IP Multimedia Subsystem (IMS), combinations thereof, or the like. In some embodiments, PDN 260 may overlap in whole or in part with enterprise network 240.

3GPP mobile network 210 may provide a mobile network cellular coverage area via one or more 3GPP access elements, such as a 3GPP access element 212, and a mobile core network 220 to provide mobile network services to one or more devices. For the embodiment of FIG. 2, it is assumed that the cellular coverage area for 3GPP access element 212 overlaps an enterprise site 250 that is associated with the enterprise. An enterprise site may be associated with a physical geographic location and/or area.

3GPP mobile network 210 may also include an API-GW 230, which may include API logic 232 and a database 234. Although only one API-GW 230 is illustrated in the embodiment of FIG. 2, it is to be understood that any number of API-GWs and/or any other network elements may be provisioned in 3GPP mobile network 210 to provide various API-GW 230 features/operations discussed herein.

Mobile core network 220 may include mobile network functions 222 and a policy server 224. In various embodiments, mobile network functions 222 and policy server 224 may include any number and/or combination of: UP/CP/policy network elements and/or VNFs configured to perform UP/CP/policy operations for the mobile core network 220. 3GPP access element 212 may interface with mobile network functions 222, which may also interface with policy server 224 and PDN 260. Policy server 224 may further interface with API-GW 230. In some embodiments, mobile network functions 222 may also interface with API-GW 230, for example, in order to activate location-based enterprise policies for one or more mobile network functions 222 directly from API-GW 230 and/or to retrieve information associated with one or more enterprise device sessions handled by one or more mobile network functions 222.

Mobile network functions 222 may be implemented as any combination and/or number of 3GPP network elements that may provide operations for 3GPP mobile network 210 associated with any combination of 3G/4G/5G/nG mobile network architectures. For example, in at least one embodiment for a 4G CUPS implementation of mobile core network 220, mobile network functions 222 may provide operations associated with any combination and/or number of 3GPP SGW-C/Us, PGW-C/Us, SAEGW-C/Us, etc. and policy server 224 may provide operations associated with any combination and/or number of 3GPP PCRFs in addition to operations discussed for embodiment described herein. Further for a 4G CUPS implementation, 3GPP access element 212 may be an eNodeB. In another example, say for embodiments in which a 5G implementation of mobile core network 220 may be provided, including 5G Standalone (SA) and Non-Standalone (NSA) implementations of mobile core network 220, mobile network functions 222 may provide operations associated with any combination and/or number of 3GPP UPFs, AMFs, SMFs, etc. and policy server 224 may provide operations associated with any combination and/or number of 3GPP PCFs in addition to operations discussed for embodiments described herein. For 5G implementations, 3GPP access element 212 may be any combination of gNodeBs (e.g., for 5G SA implementations) and/or gNodeBs and eNodeBs (e.g., for 5G NSA implementations). Any other mobile network functions 222 that may be prescribed by 3GPP standards may be included in 3GPP mobile network 210, in accordance with various embodiments.

In at least one embodiment, macro-cellular location information associated with coverage areas provided by 3GPP access elements (e.g., 3GPP access element 212) may be configured for policy server 224. In various embodiments, macro-cellular location information may include Cell Global Identifiers (CGIs), Evolved Universal Mobile Telecommunication System (UMTS) Terrestrial RAN (E-UTRAN) Cell Global Identifiers (ECGIs), Service Area Identifiers (SAIs), Routing Area Identifiers (RAIs), Global Positioning System (GPS) coordinates, Geographical Area Descriptions (GADs), combinations thereof, and/or or the like that may be associated with one or more enterprise sites. GADs, as defined in 3GPP Technical Specification (TS) 23.032, may include various shapes such as ellipsoids and polygons that may be characterized using GPS coordinates and shape descriptions to define shapes of geographic areas cell coverage(s).

Enterprise site 250 may include an enterprise WiFi AP 252 that interfaces with enterprise network 240 (e.g., via the Internet, etc.) to facilitate management, control, etc. of enterprise WiFi AP 252 by the enterprise such as, for example, to configure an enterprise SSID 254 for enterprise WiFi AP 252. An enterprise device 256 associated with the enterprise is also shown in communication system 200. For the embodiment of FIG. 2, enterprise device 256 is a connected vehicle configured with one or more RF transceivers, hardware, and software that facilitate connecting enterprise device 256 to one or more over-the-air (OTA) accesses, such as 3GPP access element 212 and enterprise WiFi AP 252.

Enterprise network 240 may include a host or client device 242, which may include an application 244 and a graphical user interface (GUI) 246 that may enable the enterprise to communicate with API-GW 230 via an API 236 in order to manage one or more location-based enterprise policies 238. In various embodiments, managing may include, but not be limited to: customizing one or more mobile network policies associated with one or more proximity-triggered enterprise policy application services in order to provide one or more location-based enterprise policies 238 for application via 3GPP mobile network 210 and/or requesting, modifying, and/or removing one or more mobile network policies associated with the provisioned location-based enterprise policies 238 that are contingent on the enterprise device 256 being proximate to the one or more enterprise sites (e.g., enterprise site 250). Client device 242 may include any processor(s), memory element(s) (including logic, etc.), storage, or the like to facilitate various operations discussed herein.

In various embodiments, an enterprise device (e.g., enterprise device 256) may be associated with any user, user equipment (UE), subscriber, employee, client, customer, electronic device, etc. wishing to initiate a packet flow for one or more services provided via 3GPP mobile network 210. The terms 'UE device', 'UE', 'subscriber', 'UE/subscriber', 'mobile device', 'user', and variations thereof are inclusive of enterprise devices used to initiate a communication, such as a computer, an electronic device such as an appliance, Internet of Things (IoT) device, etc., a personal digital assistant (PDA), a laptop or electronic notebook, a connected vehicle, a cellular telephone, an iPhone™, iPad™, a Google Droid™ phone, an IP phone, wearable electronic device or any other device, component, element, or object capable of initiating voice, audio, video, media, or data exchanges within 3GPP mobile network 210. Enterprise devices may also be configured with one or more applications capable of initiating and/or responding to voice, audio, video, media, or data exchanges within 3GPP mobile network 210. Enterprise devices discussed herein may also be inclusive of a suitable interface to a human user such as a microphone, a display, a keyboard, or other terminal equipment. Enterprise devices may also be any device that seeks to initiate a communication on behalf of another entity or element such as a program, a database, or any other component, device, element, or object capable of initiating an exchange within mobile network 3GPP mobile network 210. Other variations of enterprise devices can be envisioned.

API logic 232 of API-GW 230 may include instructions that, when executed (e.g., by processor(s) of API-GW 230) may facilitate various operations for API-GW 230 including, but not limited to: receiving and transmitting API procedure calls; facilitating authentication/authorization operations associated with on-boarding the enterprise (and/or other enterprises) to access/interact with one or more mobile network policies; exposing mobile network policies to the enterprise following successful authentication/authorization; receiving inputs from the enterprise (via API 236) associated with configuring mobile network policies for configuring location-based enterprise policies; providing location-based enterprise policies to policy server 224 and/or mobile network functions 222 (in some embodiments); cooperating and/or interacting with other logic (internal and/or external to API-GW 230); maintaining and/or interacting with stored data, information, parameters; combinations thereof; and/or the like to facilitate various operations as discussed for various embodiments described herein. In at least one embodiment, SP policies, interface information (e.g., provided to the enterprise via one or more GUIs), combinations thereof, and/or the like may be stored in database 234.

During operation, various API procedure calls may be executed via one or more network elements, nodes, devices, etc. within a system (e.g., system 100 and/or communication system 200) to perform various operations as described for embodiments herein. For example, in some instances, API logic 232 may be the receiving end of an API procedure call, which may be originated by application 244 in combination with one or more inputs provided to via GUI 246 and may result in one or more operations being performed by API-GW 230. Any order, direction, combination, etc. of API procedure calls can be envisioned to facilitate operations described herein.

Consider an operational example in which mobile network policies for one or more services are provisioned by the MNO/SP and applied across a given use case say, for example, a connected vehicle use case. One of these services may include a proximity-triggered enterprise policy application service. The mobile network policies may cover aspects such as, for example, permitted application connectivity, throughput limits, data volumes, sleep/awake cycles, threat protection rules and so on for the proximity-triggered enterprise policy application services. The mobile network policies may be configured for database 234.

Thereafter, the enterprise may contract to use the proximity-triggered enterprise policy application service offered by the given use case (e.g., a Network-As-A-Service approach). Via API-GW 230, API 236, and client device 242, the enterprise may be permitted to populate data from allowed sets, ranges etc. to customize or configure the use case without impacting the underlying integrity of 3GPP mobile network 210 in order to provide one or more location-based enterprise policies 238 for 3GPP mobile network 210 such that the one or more location-based enterprise policies 238 may be applied to enterprise device 256 via 3GPP mobile network 210 when enterprise device 256 is/is not proximate to enterprise site 250.

Enterprise policies are typically defined based on organizational groups. In this operational example, one group could be 'customers with gold plan incorporating predictive maintenance' or some similar group. Within a group, there could be the subset of those that opted-in to 'offer notification' in some embodiments. Many variations are possible and may influence the enterprise data population to tailor mobile network policies for application to enterprise devices in accordance with embodiments described herein. For example, in at least one embodiment, for each of one or more sub-groups and potentially individual subscription within a subscription, further customization of policy may be applied based on standards-defined approaches.

Configuring mobile network policies for one or more location-based enterprise policies 238 may include the enterprise configuring various exposed mobile network policies in which the enterprise assigns member identities (e.g., for one or more organizational groups and/or sub-groups) to the proximity-triggered enterprise policy application service. In various embodiments, member identities may include mobile telephone numbers, Mobile Station International Subscriber Directory Numbers (MSISDNs), International Mobile Subscriber Identities (IMSIs), IP addresses, device types (e.g., IoT devices, mobile communication devices, laptops, etc.), combinations thereof, and/or the like. For the present operational example, the enterprise may assign an IMSI associated with enterprise device 256 to the proximity-triggered enterprise policy application service.

In some embodiments, configuring mobile network policies for one or more location-based enterprise policies 238 may further include the enterprise configuring SSIDs associated with enterprise WiFi APs for one or more enterprise sites associated with the enterprise. For the present operational example, the enterprise may customize the proximity-triggered enterprise policy application service to include enterprise SSID 254 that may be broadcast by enterprise WiFi AP 252 for enterprise site 250.

In some embodiments, configuring mobile network policies for one or more location-based enterprise policies 238 may include the enterprise defining a physical geographic location for each of the one or more enterprise sites, which policy server 224 may use to correlate particular mobile network cellular coverage areas with the one or more enterprise sites. The correlation between cellular coverage areas and enterprise sites may be utilized by policy server 224 for notifying the enterprise when an enterprise device associated with a particular location-based enterprise policy is in proximate to an enterprise site that is overlapped by a known cellular coverage area. For example, based on the physical geographic location of enterprise site 250, it is known by the policy server 224 that the cellular coverage area for 3GPP access element 212 overlaps enterprise site 250. In one embodiment, the notification from policy server 224 to the enterprise (e.g., to client device 242) when enterprise device 256 is proximate to enterprise site 250 may include the enterprise SSID 254 detected by the enterprise device at the enterprise site 250.

In still some embodiments, configuring mobile network policies may not include definition of physical geographic locations of one or more enterprise sites; rather, in such embodiments, policy server 224 may notify the enterprise of a geographic characterization of the area in which an enterprise device reports detected SSIDs rather than notifying the enterprise of the detected SSIDs. In such embodiments, the policy server 224 would not have to know the geographic locations of the enterprise site. Instead, the enterprise could determine (e.g., via client device 242) which site is in the geographic area included in the notification. In such embodiments, policy server 224 would also not have to have visibility into the SSIDs for one or more enterprise sites but places implicit trust that enterprise device 256 has securely evaluated a proximity to an enterprise site and sourced the reporting of proximity to mobile core network 220. Thus, reporting from enterprise device 256 in such embodiments may not include detected SSIDs, but, more generally, may be a trigger event reported to mobile core network 220.

In still some embodiments, configuring mobile network policies may include any combination of configuring enterprise SSIDs for one or more enterprise sites, configuring physical geographic locations for one or more enterprise sites, and/or configuring neither SSIDs nor physical geographic locations for one or more enterprise sites. For example, some specific location-based enterprise policies may be applied at specific enterprise sites based on endpoint proximity to the specific sites while other location-based enterprise policies may be applied across all enterprise sites for an enterprise.

Configuring mobile network policies for one or more location-based enterprise policies 238 may also include configuring application information for one or more enterprise device applications to which the one or more location-based enterprise policies 238 is to be applied when enterprise device is in proximity of enterprise site 250. In various embodiments, application information may include, but not be limited to: application identifying information (e.g., identifying an application by a name, value, etc.), types of applications, classes of applications, combinations thereof, or the like.

Following configuration of one or more location-based enterprise policies 238 by the enterprise, API-GW 230 provisions the one or more location-based enterprise policies 238 for policy server 224. In at least one embodiment, provisioning the policy server 224 may include populating one or more locations and/or sets of locations and then associating each location/sets of locations with a location-based enterprise policy. The provisioning can also include adding whether a policy related action is to include notifying the enterprise when an enterprise device is proximate to an enterprise site for location-based enterprise policy or providing the notification to the enterprise in addition to one or more other policy actions that could be performed for the enterprise device session.

Thereafter, when enterprise device 256 with a mobile subscription associated with 3GPP mobile network 210 attaches to 3GPP mobile network 210 (e.g., via 3GPP mobile network connection 214 facilitated via 3GPP access element 212) and a session is established for enterprise device 256, the policy server 224 constructs and requests application of the location-based enterprise policy to that session. For example, in some embodiments, policy server 224 may activate, update, modify, and/or remove one or more mobile network policies for the enterprise device 256 session based on the one or more location-based enterprise policies 238 upon attachment of enterprise device 256 to 3GPP mobile network 210.

In some embodiments, the enterprise device 256 may be notified upon session establishment to enable enterprise SSID reporting (e.g., reporting of actual detected enterprise SSID(s) or reporting a notification that enterprise SSID(s) are detected) to policy server 224. For example, the enterprise may configure a location-based enterprise policy that includes notifying enterprise device 256 to enable enterprise SSID reporting for one or more enterprise SSIDs. Other mechanisms may be used to enable enterprise SSID reporting for enterprise devices. For example, in some embodiments, the enterprise may enable SSID reporting for the enterprise device 256 using a direct over-the-air action when the enterprise device is connected to the enterprise network 240 (e.g., via one or more enterprise WiFi APs). The enterprise device 256 may also be sent a notification to report when enterprise SSIDs are no longer detected after having been detected.

Enterprise device 256 may be mobile (e.g., moving throughout different locations) within 3GPP mobile network 210. As enterprise device 256 is mobile within 3GPP mobile network 210, its location can be determined by policy server 224 on session establishment, through inter-eNodeB handovers, Tracking Area Updates (TAUs), Routing Area Updates (RAUs), or the like as prescribed by 3GPP standards.

When the enterprise device 256 is in proximity of enterprise site 250 it may detect the broadcast enterprise SSID 254 for enterprise WiFi AP 252. Enterprise device 256 may notify policy server 224 of the detected enterprise SSID 254. The notification from enterprise device 256 will include an identity (e.g., IMSI) of the enterprise device 256. In one embodiment, the notification may include enterprise device 256 reporting the detected enterprise SSID 254 to policy server 224 via 3GPP access element 212 and one or more mobile network functions 222. In another embodiment, the notification may include enterprise device 256 sending a notification to policy server 224 that an enterprise SSID has been detected in which the notification may not include the detected enterprise SSID 254.

Receiving the notification from enterprise device 256 at the macro-cellular location that is associated with location-based enterprise policies 238 associated for the enterprise device 256 session may trigger one or more policy related actions by policy server 224 for the one or more location-based enterprise policies 238. In various embodiments, the one or more policy related actions performed by policy server 224 may include identifying the one or more location-based enterprise policies 238 applied to the enterprise device 256 session based on the notification received from the enterprise device, the macro-cellular location of the enterprise device, and the location(s) associated with the location-based enterprise policies 238 and triggering activation of one or more mobile network policies of the one or more location-based enterprise policies 238 that are applied to enterprise device 256 session via 3GPP mobile network 210. The one or more policy related actions may also include notifying the enterprise (e.g., via API-GW 230, API 236, and client device 242) that enterprise device 256 is on or very close to enterprise site 250, which may trigger one or more actions by the enterprise.

Upon receiving the notification that enterprise device 256 is on or very close to enterprise site 250, the enterprise (e.g., via client device 242, API 236, and API-GW 230) may request, modify, and/or remove one or more mobile network policies that may be associated with the one or more of the location-based enterprise policies 238.

In various embodiments, mobile network policies that may be activated, requested, modified, and/or removed for an enterprise device (e.g., enterprise device 256) and/or one or more applications of an enterprise device may include, but not be limited to, modifying permitted application connectivity, throughput limits, data volumes, sleep/awake cycles, threat protection rules, and/or any other behaviors/operations/etc. for one or more enterprise device and/or for one or more applications that may be configured for the enterprise device.

In at least one embodiment, mobile network policies associated with permitted application connectivity may include enterprise configurable application connectivity allowing an enterprise device and/or one or more applications of the enterprise device to connect to one or more networks (e.g., enterprise network 240), services (e.g., within PDN 260 or 3GPP mobile network 210), and/or the like when the device is proximate to one or more configurable enterprise sites.

In at least one embodiment, mobile network policies associated with throughput limits may include enterprise configurable cellular throughput limit rules (e.g., uplink and/or downlink megabits per second (Mbps)) for an enterprise device and/or one or more applications of the enterprise device when the device is proximate to one or more configurable enterprise sites. In at least one embodiment, mobile network policies associated with data volumes may include enterprise configurable cellular data limit rules (e.g., higher or lower data caps) for an enterprise device and/or one or more applications of the enterprise device when the device is proximate to one or more configurable enterprise sites. In at least one embodiment, mobile network policies associated with threat protections may include enterprise configurable Uniform Resource Locator (URL) addresses that may be accessible or inaccessible by an enterprise device and/or one or more applications of the enterprise device when the device is proximate to one or more configurable enterprise sites. In at least one embodiment, mobile network policies associated with sleep/awake cycles may include enterprise configurable sleep/wake cycle rules associated with power consumption (e.g., triggering sleep or wake actions) for an enterprise device and/or one or more applications of the enterprise device when the mobile device is proximate to one or more enterprise sites.

In some embodiments, activating one or more mobile network policies of the one or more location-based enterprise policies 238 that are to be applied via 3GPP mobile network 210 to enterprise device 256, may include any combination of: sending an informational notification to enterprise device and/or sending a notification to enterprise device 256 to trigger activation of at least one mobile network policy for one or more applications configured for enterprise device 256, which may result in activating and/or modifying one or more operations that may be performed by the one or more applications. Some policy actions activated for enterprise device 256 as discussed for embodiments herein (e.g., data limits, throughput limits, threat protections, etc.) may be activated for the enterprise device 256 session using existing mechanisms available within 3GPP mobile network 210.

Consider, for example, that enterprise device applications may fall into two classes: those that are executing periodically (e.g., to collect diagnostic information) and those that only execute as a result of being in the likely proximity of an enterprise site/network.

For the first class of applications that execute periodically, the level of diagnostic data normally collected via such applications may be informative with warnings for various cases, much as happens today. In at least one embodiment, when 'proximity to an enterprise' is determined using techniques as described herein, the collection of much more detailed information of use only to trained technicians could be initiated.

For example, in at least one embodiment, diagnostic data could be gathered whilst the enterprise device 256 (the connected vehicle in this embodiment) is in use, potentially saving the need for a technician to conduct drive testing as part of fault analysis. Such operations may be analogous to proactively enabling debug operations, knowing that the data has a high likelihood of being useful and 'captureable/storeable' when enterprise device 256 is in proximity of enterprise site 250.

In some embodiments, a mobile network policy associated with a proximity-triggered enterprise policy application service could also dictate that the enterprise device 256 is to connect to the enterprise network 240 via enterprise WiFi AP 252 to transfer detailed debug information, as it is generated, permitting analysis, troubleshooting, and/or determination of corrective actions and identifying the necessary parts (e.g., physical, software changes, setting modifications, etc.) prior to the vehicle coming to a stop at the enterprise site 250 (e.g., a dealership). A benefit of transferring data once connected to the enterprise network 240 is in sizing of the MNO/SP network (3GPP mobile network 210) for these cases. Enterprise network transfer of data allows the enterprise to directly monitor the transfer rather than via the MNO/SP network as the MNO/SP network may have other higher priority users that may preventing the just-in-time data arriving at the enterprise location. Thus, for enterprise device applications that execute periodically, techniques provided herein may be used to modify the behavior and/or operations for the applications based on proximity of an enterprise device to an enterprise site.

For the second class of applications that may only execute as a result of being in the likely proximity of an enterprise network/location, when 'proximity to an enterprise' is determined by the macro-cellular network, techniques as provided herein may be used to trigger one or more mobile network policies to be activated for one or more applications configured for an enterprise device that cause one or more behaviors/operations to execute for the applications.

Thus, in at least one embodiment, proximity to enterprise site 250 may trigger a notification to be sent to enterprise device 256 via the 3GPP mobile network 210 that triggers activation and/or modification of one or more operations for one or more applications configured for enterprise device 256. In one example, a notification sent to an enterprise device could be a background data transfer action communicated via a Short Message Service (SMS) message that triggers operations associated with an 'offer-awaiting-you' application based on the user/enterprise device having opted-in to such notifications. In at least one embodiment, a location-based enterprise policy could be configured to prevent such notifications from occurring when an enterprise device is 'out-of-proximity' of one or more enterprise sites.

These examples are only a few of the many different application behaviors/operations that may be modified and/or triggered using proximity-triggered enterprise policy application services. The uniqueness of different application behaviors/operations that may be modified and/or triggered based on the combination of determining enterprise proximity by detecting an enterprise-managed WiFi network once in a macro-cellular location where it is known that those enterprise networks should be present may be enterprise configurable. Thus, proximity-triggered application modification, removal, execution, and/or notification (e.g., enhanced information gathering, etc.) permits a more tailored customer-care experience and addresses some concerns around volume of data gathered by a system, the nuisance of notifications, or the like. In some embodiments, techniques described herein relating the ability to change proximate-location triggered policies can be readily extended for modification revocation and per subscription exception policy management (e.g., as applied to one subscriber of a group as opposed to all subscribers of a group).

When enterprise device 256 moves away from enterprise site 250, policy server 224 may trigger deactivation of the one or more location-based enterprise policies 238. For example, enterprise device 256 can be configured to send a notification to policy server 224 that indicates that the enterprise SSID 254 is no longer detected when the enterprise device 256 no longer detects the enterprise SSID.

Figure 3:
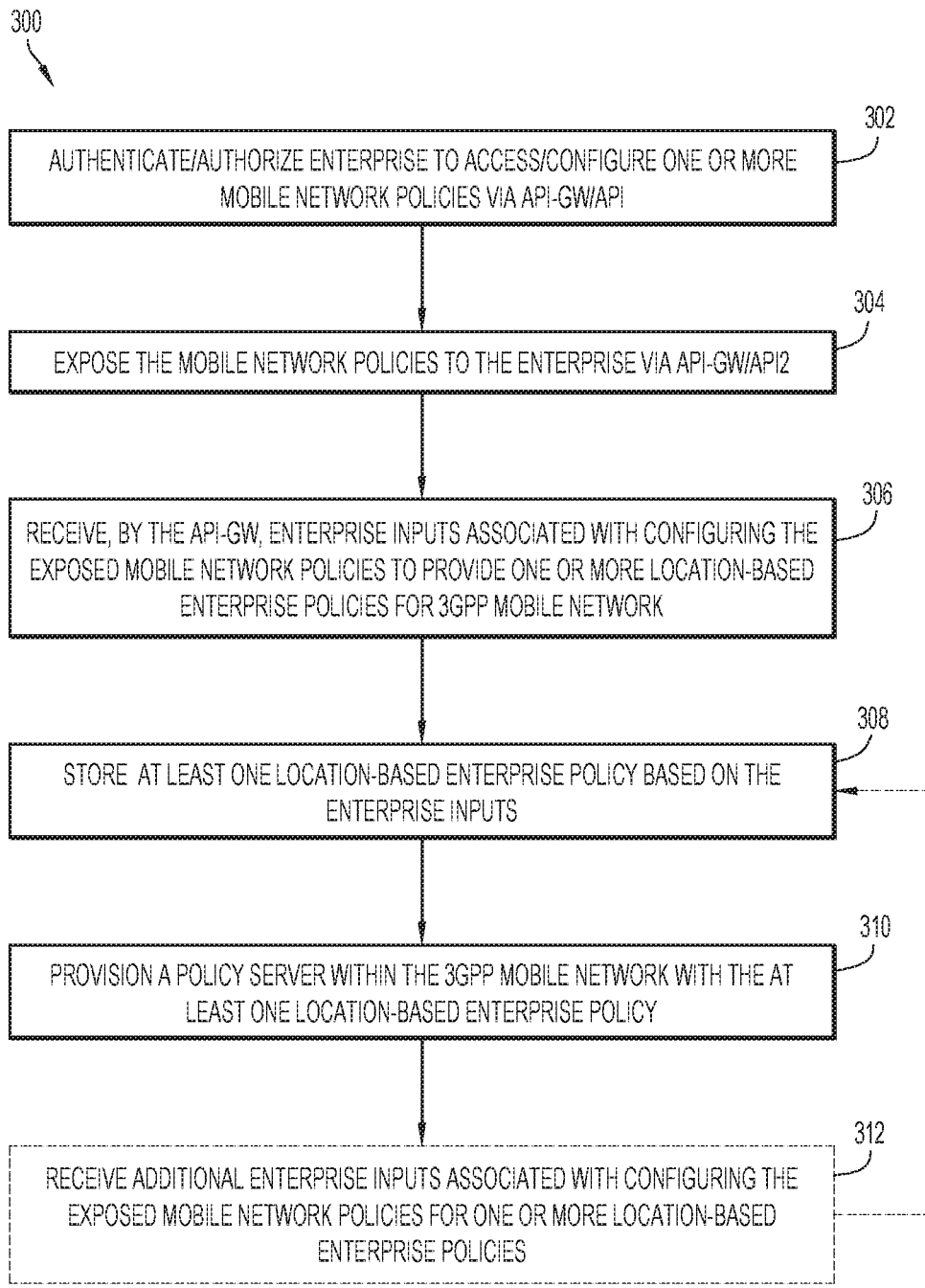
FIG. 3 is a simplified flow chart illustrating example operations associated with provisioning location-based enterprise policies within a mobile network, according to an example embodiment.

Referring to FIG. 3, FIG. 3 is a simplified flow chart illustrating example operations 300 associated with provisioning location-based enterprise policies within a mobile network, according to an example embodiment. In at least one embodiment, operations 300 may be performed via an API-GW in association with an API and a policy server of a 3GPP mobile network (e.g., API-GW 230 in association with API 236 and policy server 224 of 3GPP mobile network 210) and a client device associated with an enterprise network of an enterprise (e.g., client device 242 of enterprise network 240).

At 302, the operations may include authenticating/authorizing the enterprise to access/configure one or more mobile network policies via the API-GW/API. In at least one embodiment, the operations at 302 may include the enterprise offering one or more credentials to the API-GW by the enterprise via the client device and the API-GW authenticating/authorizing access of the enterprise to configure the mobile network policies.

At 304, the operations may include exposing the mobile network policies to the enterprise. In at least one embodiment, the operations at 304 may include the API-GW providing the mobile network policies to the enterprise via the API and an application/GUI provided by the client device within the enterprise network.

At 306, the operations may include receiving, by the API-GW, enterprise inputs associated with configuring the exposed mobile network policies to provide one or more location-based enterprise policies for the 3GPP mobile network.

In at least one embodiment, the operations at 306 may include the API-GW, via the API, receiving enterprise inputs for configuring or identifying member identities (e.g., mobile telephone numbers, IMSIs, etc.) for one or more exposed mobile network policies in which the member identities are associated with one or more enterprise use cases for which location-based enterprise policies are to be applied at one or more enterprise sites. Further, the operations at 306 may include receiving enterprise inputs for configuring or identifying applications for which the exposed mobile network policies are to be applied for the associated member identities.

In at least one embodiment, the operations at 306 may also include the API-GW, via the API, receiving enterprise inputs for configuring enterprise SSIDs for one or more exposed mobile network policies in which the enterprise SSIDs are the enterprise SSIDs that are broadcast by one or more enterprise WiFi APs at the one or more enterprise sites. In at least one embodiment, the operations at 306 may also include the API-GW, via the API, receiving enterprise inputs for configuring geographic location information for the one or more enterprise sites.

In various embodiments, enterprise inputs or, more generally, inputs, as referred to herein may include any type of interface (e.g., GUI) inputs such as, for example, typed inputs, input selections (e.g., selections of one or more fields of a GUI), uploaded/downloaded inputs (e.g., for loading one or more file(s), document(s), etc.) identifying member identities, enterprise SSIDs, etc.), combinations thereof, and/or any other inputs that can be envisioned for networking environments.

Consider an example in which the enterprise desires to customize an exposed mobile network policy for a proximity-triggered enterprise policy application service associated with enterprise device application throughput limits in order to provide a throughput limit location-based enterprise policy for the 3GPP mobile network. In such an example, the enterprise could select the mobile network policy that it desires to configure for a given use case and set the throughput limits for the mobile network policy. The enterprise could further configure member identities for the given enterprise use case and configure applications to which the policy is to be applied. In some cases, the enterprise could also configure enterprise SSID(s) and geographic location information for enterprise sites at which the policy.

At 308, the operations may include storing at least one location-based enterprise policy at the API-GW based on the enterprise inputs. In at least one embodiment, the operations at 308 may include storing the at least one location-based enterprise policy within a database of the API-GW (e.g., within database 234 of API-GW 230).

At 310, the operations may include the API-GW provisioning a policy server within the 3GPP mobile network with the at least one location-based enterprise policy.

In some embodiments, as shown at 312, the operations may include receiving additional enterprise inputs (e.g., updates, changes, etc.) associated with configuring the exposed mobile network policies for one or more location-based enterprise policies. For example, additional enterprise inputs may be received following notification of the enterprise that one or more enterprise devices are proximate to one or more enterprise sites.

Figure 4:
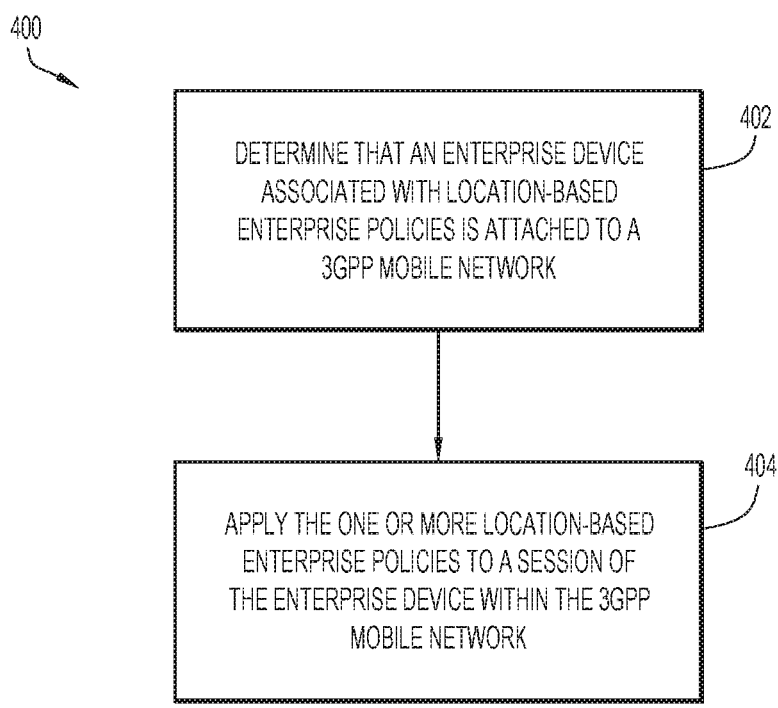
FIG. 4 is a simplified flow chart illustrating example operations associated with techniques that provide for location-based enterprise policy application within a mobile network, according to an example embodiment.

Referring to FIG. 4, FIG. 4 is a simplified flow chart illustrating example operations 400 associated with techniques that provide for location-based enterprise policy application within a mobile network, according to an example embodiment. In at least one embodiment, operations 400 may be performed via an API-GW and a policy server of a 3GPP mobile network (e.g., API-GW 230 and policy server 224 of 3GPP mobile network 210). At 402, the operations may include determining that an enterprise device (e.g., enterprise device 256) associated with one or more location-based enterprise policies is attached to the 3GPP mobile network. In at least one embodiment, the determination at 402 may be based on establishing a session for the enterprise device within the 3GPP mobile network via the policy server and determining that an identity (e.g., IMSI) of the enterprise device is assigned to one or more location-based enterprise policies. At 404, the operations may include the policy server applying the one or more location-based enterprise policies to a session of the enterprise device within the 3GPP mobile network.

Figure 5:
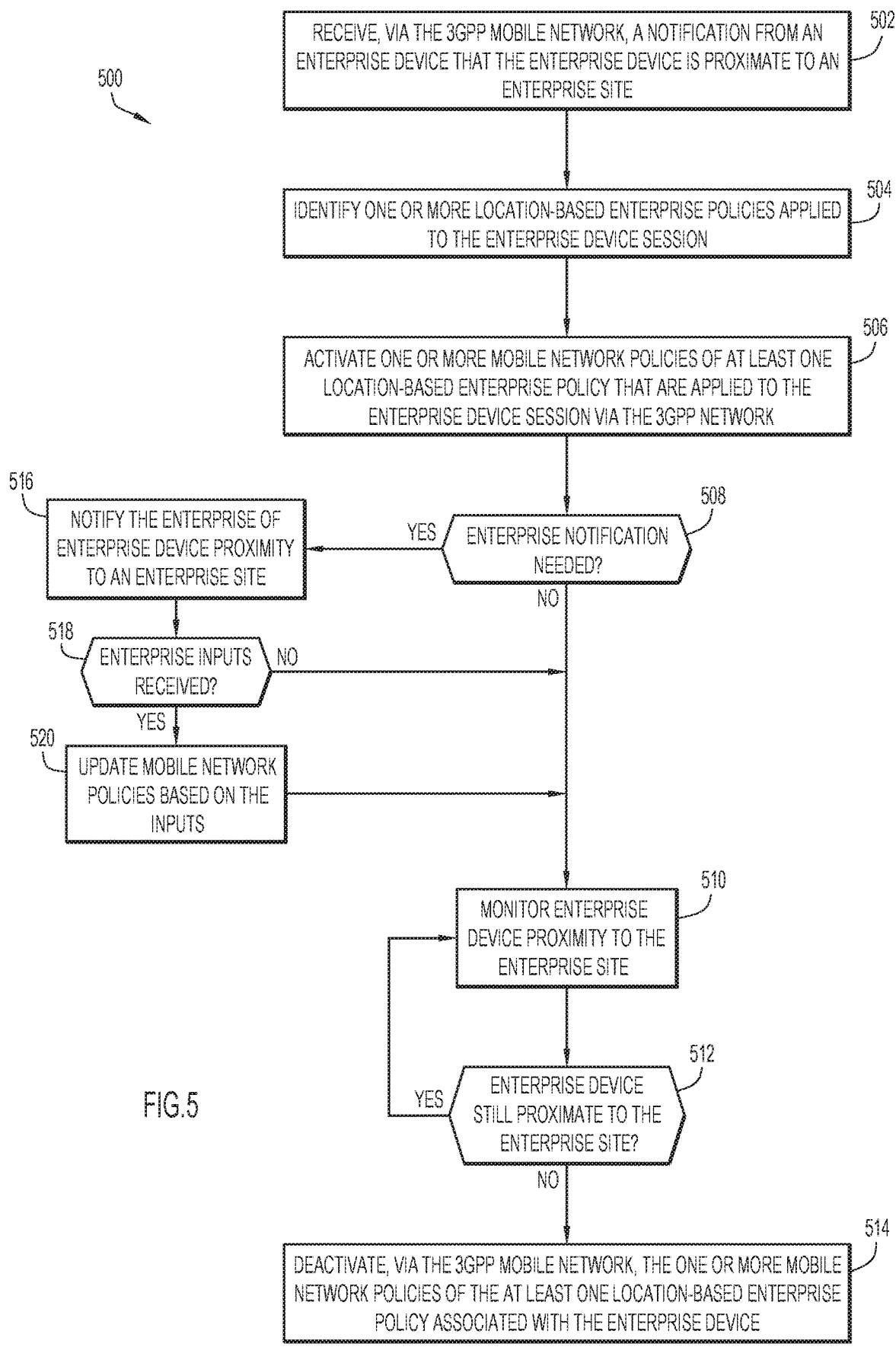
FIG. 5 is a simplified flow chart illustrating other example operations associated with techniques that provide for location-based enterprise policy application within a mobile network, according to an example embodiment.

Referring to FIG. 5, FIG. 5 is a simplified flow chart illustrating yet other example operations 500 associated with techniques that provide for location-based enterprise policy application within a mobile network, according to an example embodiment. In at least one embodiment, certain operations 500 may be performed via any combination of a policy server and/or an API-GW/API of a 3GPP mobile network (e.g., policy server 224 and/or API-GW 230/API 236 of 3GPP mobile network 210). In at least one embodiment, operations 500 may be performed for any enterprise device attached to the 3GPP mobile network for which a session has been established.

At 502, the operations may include the policy server receiving, via the 3GPP mobile network, a notification from an enterprise device that the enterprise device is proximate to an enterprise site. The notification from the enterprise device will include an identity (e.g., IMSI) of the enterprise device. In at least one embodiment, the enterprise device may send a notification to the policy server that includes one or more enterprise SSIDs detected by the enterprise device. In at least one embodiment, the enterprise device may send a notification to the policy server that indicates that the enterprise device has detected one or more enterprise SSIDs, while not including the detected SSIDs in the notification.

At 504, the operations may include the policy server identifying one or more location-based enterprise policies applied to the enterprise device session. In at least one embodiment, the identifying at 504 may include identifying that at least one of one or more enterprise SSIDs included in the notification received from the enterprise device is identified for the one or more location-based enterprise policies (e.g., performing a look-up on the received detected enterprise SSIDs in relation to enterprise SSIDs configured for one or more locations and/or sets of locations that are associated with one or more location-based enterprise policies and at which the enterprise device is currently located within the 3GPP mobile network). In another embodiment, the identifying at 504 may include identifying based on the identity (e.g., IMSI) of the enterprise device that the enterprise device is assigned to the one or more location-based enterprise policies (e.g., performing a look-up on the enterprise identity in relation to member identities assigned to one or more locations and/or sets of locations associated with one or more location-based enterprise policies at which the enterprise device is currently located within the 3GPP mobile network).

At 506, the operations may include the policy server activating one or more mobile network policies of at least one location-based enterprise policy that are applied to the enterprise device session via the 3GPP mobile network.

In various embodiments, activating one or more mobile network policies may include, but not be limited to, modifying via the 3GPP network permitted application connectivity, throughput limits, data volumes, sleep/awake cycles, threat protection rules, and/or any other behaviors/operations/etc. for the enterprise device and/or for one or more applications that may be configured for the enterprise device.

In some embodiments, activating one or more mobile network policies may include any combination of: sending an informational notification to the enterprise device and/or sending a notification to the enterprise device via the 3GPP network to trigger activating and/or modifying one or more operations that may be performed by the one or more applications of the enterprise device.

At 508, the operations may include the policy server determining whether an enterprise notification is needed based on proximity of the enterprise device to the enterprise site. In at least one embodiment, the at least one location-based enterprise policy may indicate that an enterprise notification is needed. In some embodiments, enterprise notification may be configured to be automatic for all location-based enterprise policies of an enterprise. In still some embodiments, enterprise notification may be based on enterprise device identity, enterprise device type, enterprise site, time of day, applications associated with an enterprise device, combinations thereof, and/or any other options that may be envisioned for an enterprise.

Based on a determination at 508 that no enterprise notification is needed, the operations may continue to 510 at which the policy server may monitor the location of the enterprise device in proximity to the enterprise site. The policy server can monitor the location of the enterprise device in proximity to the enterprise site based on notifications received from the enterprise device. As discussed herein, the enterprise device can report whether it is or is not detecting enterprise SSIDs. At 512, the operations may include the policy server determining whether the enterprise device is still proximate to the enterprise site. Based on a determination at 512 that the enterprise device is still proximate to the enterprise site, the operations may return to 510 at which the location of the enterprise device proximate to the enterprise location continues to be monitored. Based on a determination at 512 that the enterprise device is not proximate to the enterprise site (e.g., the enterprise device has moved away from the enterprise site and no longer detects the enterprise SSIDs), the operations may continue to 514 at which the policy server may deactivate, via the 3GPP mobile network, the one or more mobile network policies of the at least one location-based enterprise policy associated with the enterprise device.

Referring again to the operations at 508, based on a determination by the policy server 508 that the enterprise is to be notified based on proximity of the enterprise device to the enterprise site, the operations may continue to 516. At 516, the operations may include notifying the enterprise of the proximity of the enterprise device to an enterprise site. In at least one embodiment, the notifying at 516 may include the policy server sending a notification to the API-GW and the API-GW relaying the notification to a client device (e.g., client device 242) of the enterprise via the API. In some embodiments, the notification at 516 may include enterprise SSIDs received via the enterprise device notification at 502.

In still some embodiments, the notification to the enterprise at 516 may include an indication of the geographic area in which the enterprise device is located. The policy server can determine the geographic area in which the enterprise device is located based on location information associated with the cellular coverage area of the 3GPP access element (e.g., 3GPP access element 212) to which the enterprise device is connected when the enterprise device notification is received at 502.

At 518, the operations may include the API-GW determining whether any enterprise inputs have been received following the notification at 516. Based on a determination at 518 that no enterprise inputs have been received, the operations may continue to 510 and continue therefrom as discussed above. Based on a determination at 518 that enterprise inputs have been received, the operations may continue to 520 at which one or more mobile network policies may be updated based on the inputs. In various embodiments, the inputs/updates may include requests, modifications, and/or removal of one or more mobile network policies associated with the at least one location-based enterprise policy.

Figure 6:
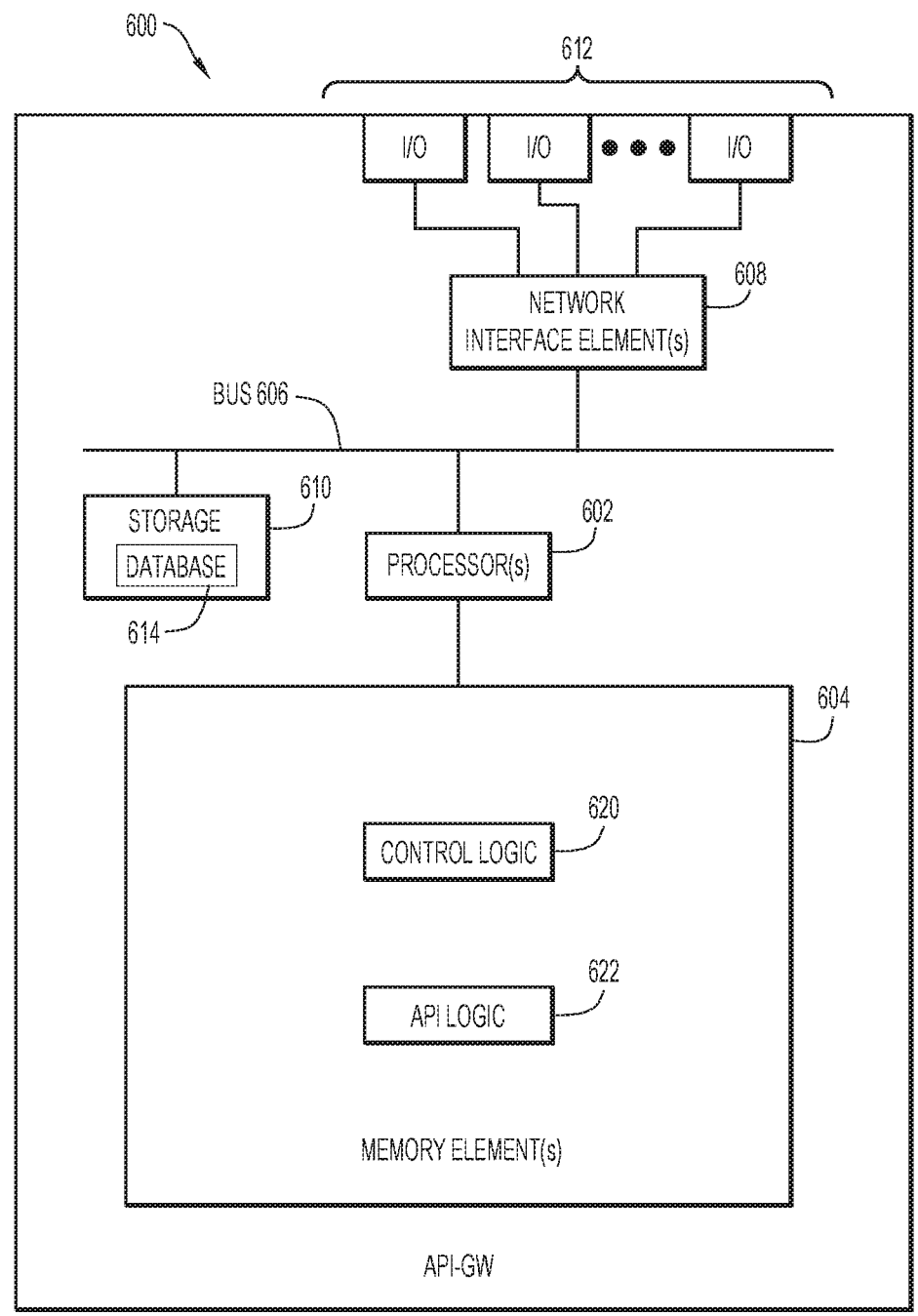
FIG. 6 is a simplified block diagram illustrating example details associated with a gateway for implementing operations described herein, according to an example embodiment.

Referring to FIG. 6, FIG. 6 is a simplified block diagram illustrating example details associated with an API-GW 600 for implementing operations described herein, according to an example embodiment. In at least one embodiment, API-GW 600 may provide operations associated with an API-GW within a 3GPP mobile network as discussed herein such as, for example, API-GW 104 as illustrated in the embodiment of FIG. 1 and API-GW 230 as illustrated in the embodiment of FIG. 2.

The embodiment of FIG. 6 illustrates API-GW 600, which includes one or more processor(s) 602, one or more memory element(s) 604, a bus 606, one or more network interface element(s) 608, and storage 610. Memory element(s) 604 may include instructions for control logic 620 and API logic 622. Storage 610 may include a database 614, for example, to store location-based enterprise policy information (e.g., member identities, SSIDs, etc.) for one or more location-based enterprise policies, as discussed herein.

In at least one embodiment, processor(s) 602 is/are at least one hardware processor configured to execute various tasks, operations, and/or functions for API-GW 600 as described herein according to software and/or instructions configured for API-GW 600. In at least one embodiment, memory element(s) 604 is/are configured to store data, information, software and/or instructions associated with API-GW 600 and logic configured for memory element(s) 604. In at least one embodiment, bus 606 can be configured as an interface that enables one or more elements of API-GW 600 (e.g., network interface element(s) 608, processor(s) 602, memory element(s) 604 (and logic, applications, etc. configured therein), etc. to communicate in order to exchange information and/or data, to perform operations, etc. In at least one embodiment, a fast kernel-hosted interconnect may be employed for API-GW 600, potentially using shared memory between processes (e.g., logic, etc.), which can enable efficient communication paths between the processes.

In various embodiments, network interface element(s) 608 enables communications (wired or wireless) between API-GW 600 and other network elements or nodes, via one or more input/output (I/O) elements 612 (e.g., ports, transceivers, etc.) at which data, information, etc. is received and transmitted to facilitate operations discussed for various embodiments described herein. In some embodiments, network interface element(s) 608 can be configured with one or more Ethernet driver(s) and/or controller(s), one or more Fibre Channel (FC) driver(s) and/or controllers, one or more Radio Frequency (RF) driver(s) and/or controllers (e.g., for WiFi or any other unlicensed spectrum communications, for 3GPP or any other licensed spectrum communications, and/or or any other similar network interface driver(s) and/or controller(s) to enable communications for API-GW 600 within a communication system. API-GW 600 can include any suitable interfaces for receiving, transmitting, and/or otherwise communicating data and/or information in a network environment.

In various embodiments, storage 610 can be configured to store data, information and/or instructions associated with API-GW 600 and/or logic configured for memory element(s) 604. Note that in certain examples, storage 610 can be consolidated with memory elements 604 (or vice versa), and/or the storage/memory elements can overlap/exist in any other suitable manner.

In various embodiments, control logic 620 can include instructions that, when executed (e.g., by processor(s) 602) cause API-GW 600 to perform operations, which can include, but not be limited to: performing control, management, etc. operations associated with API-GW 600; cooperating and/or interacting with other logic (internal and/or external to API-GW 600); maintaining and/or interacting with stored data, information, parameters; combinations thereof; and/or the like to facilitate various operations as discussed for various embodiments described herein.

In various embodiments, API logic 622 may include instructions that, when executed (e.g., by processor(s) 602) may facilitate various operations including, but not limited to: receiving/transmitting API procedure calls (e.g., via an API such as API 236 in communication with one or more enterprise hosted application(s) within an enterprise network(s)); providing authentication/authorization operations associated with providing an enterprise the ability to access and customize one or more SP policies for one or more location-based enterprise policies; cooperating and/or interacting with other logic (internal and/or external to API-GW 600); maintaining and/or interacting with stored data, information, parameters; combinations thereof; and/or the like to facilitate various operations as discussed for various embodiments described herein.

In various embodiments, memory element(s) 604 may include any suitable memory element such as random access memory (RAM), dynamic RAM (DRAM), static RAM (SRAM), and/or cache memory. In general, memory element(s) 604 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 610 may include any suitable storage such as persistent storage, which may be a magnetic disk drive, a solid state hard drive, a semiconductor storage device, read only memory (ROM), an erasable programmable read only memory (EPROM), flash memory, or any other computer readable storage media, which may be inclusive of non-transitory tangible media and/or non-transitory computer readable storage media, that is capable of storing program/logic/software instructions and/or digital information. In some embodiments, the media used by storage 610 may also be removable. For example, a removable hard drive may be used for storage 610. Other examples include optical and magnetic disks, thumb drives, and smart cards that are inserted into a drive for transfer onto another computer readable storage medium that is also part of storage 610.

Figure 7:
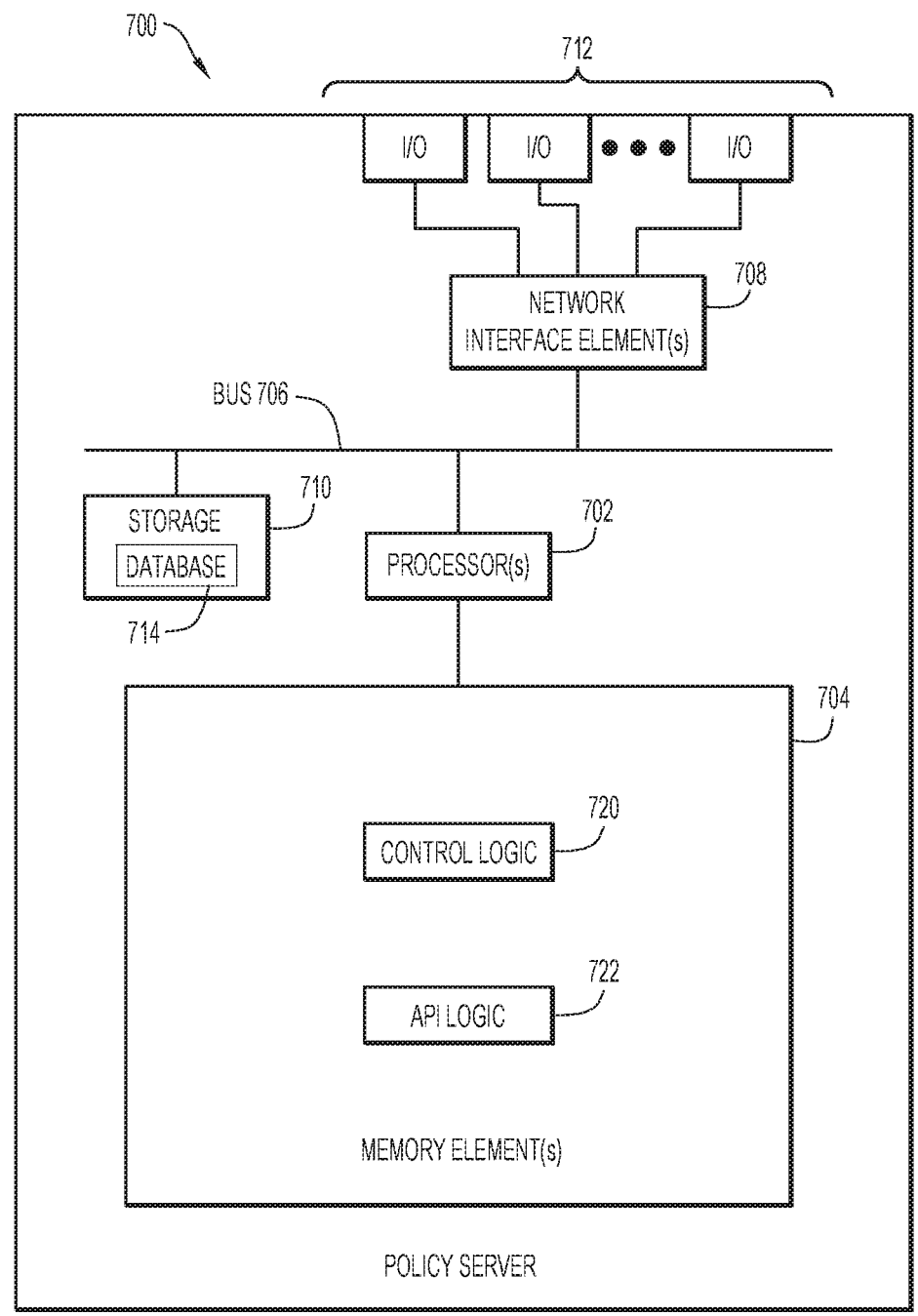
FIG. 7 is a simplified block diagram illustrating example details associated with a policy server for implementing operations described herein, according to an example embodiment.

Referring to FIG. 7, FIG. 7 is a simplified block diagram illustrating example details associated with a policy server for implementing operations described herein, according to an example embodiment. In at least one embodiment, policy server 700 may provide operations associated with a policy server within a 3GPP mobile network as discussed herein such as, for example, policy server 224 as illustrated in the embodiment of FIG. 2.

The embodiment of FIG. 7 illustrates policy server 700, which includes one or more processor(s) 702, one or more memory element(s) 704, a bus 706, one or more network interface element(s) 708, and storage 710. Memory element(s) 704 may include instructions for control logic 720 and API logic 722. Storage 710 may include a database 714, for example, to store one or more location-based enterprise policies and/or any other information as discussed herein.

In at least one embodiment, processor(s) 702 is/are at least one hardware processor configured to execute various tasks, operations, and/or functions for policy server 700 as described herein according to software and/or instructions configured for policy server 700. In at least one embodiment, memory element(s) 704 is/are configured to store data, information, software and/or instructions associated with policy server 700 and logic configured for memory element(s) 704. In at least one embodiment, bus 706 can be configured as an interface that enables one or more elements of policy server 700 (e.g., network interface element(s) 708, processor(s) 702, memory element(s) 704 (and logic, applications, etc. configured therein), etc. to communicate in order to exchange information and/or data, to perform operations, etc. In at least one embodiment, a fast kernel-hosted interconnect may be employed for policy server 700, potentially using shared memory between processes (e.g., logic, etc.), which can enable efficient communication paths between the processes.

In various embodiments, network interface element(s) 708 enables communications (wired or wireless) between policy server 700 and other network elements or nodes, via one or more input/output (I/O) elements 712 (e.g., ports, transceivers, etc.) at which data, information, etc. is received and transmitted to facilitate operations discussed for various embodiments described herein. In some embodiments, network interface element(s) 708 can be configured with one or more Ethernet driver(s) and/or controller(s), one or more Fibre Channel (FC) driver(s) and/or controllers, one or more Radio Frequency (RF) driver(s) and/or controllers (e.g., for WiFi or any other unlicensed spectrum communications, for 3GPP or any other licensed spectrum communications, and/or or any other similar network interface driver(s) and/or controller(s) to enable communications for policy server 700 within a communication system. Policy server 700 can include any suitable interfaces for receiving, transmitting, and/or otherwise communicating data and/or information in a network environment.

In various embodiments, storage 710 can be configured to store data, information and/or instructions associated with policy server 700 and/or logic configured for memory element(s) 704. Note that in certain examples, storage 710 can be consolidated with memory elements 704 (or vice versa), and/or the storage/memory elements can overlap/exist in any other suitable manner.

In various embodiments, control logic 720 can include instructions that, when executed (e.g., by processor(s) 702) cause policy server 700 to perform operations, which can include, but not be limited to: performing control, management, etc. operations associated with policy server 700; monitoring enterprise device locations; applying one or more location-based enterprise policies to a session of an enterprise device; activating one or more mobile network policies for one or more enterprise devices and/or enterprise device applications for one or more location-based enterprise policies; cooperating and/or interacting with other logic (internal and/or external to policy server 700); maintaining and/or interacting with stored data, information, parameters; combinations thereof; and/or the like to facilitate various operations as discussed for various embodiments described herein.

In various embodiments, API logic 722 may include instructions that, when executed (e.g., by processor(s) 702) may facilitate various operations including, but not limited to: receiving/transmitting API procedure calls via API logic configured for an API-GW to facilitate the exchange of data and/or information and/or to perform various operations that may be associated with provisioning one or more location-based enterprise policies for policy server 700; cooperating and/or interacting with other logic (internal and/or external to policy server 700); maintaining and/or interacting with stored data, information, parameters; combinations thereof; and/or the like to facilitate various operations as discussed for various embodiments described herein.

In various embodiments, memory element(s) 704 may include any suitable memory element such as RAM, DRAM, SRAM, and/or cache memory. In general, memory element(s) 704 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 710 may include any suitable storage such as persistent storage, which may be a magnetic disk drive, a solid state hard drive, a semiconductor storage device, ROM, an EPROM, flash memory, or any other computer readable storage media, which may be inclusive of non-transitory tangible media and/or non-transitory computer readable storage media, that is capable of storing program/logic/software instructions and/or digital information. In some embodiments, the media used by storage 710 may also be removable. For example, a removable hard drive may be used for storage 710. Other examples include optical and magnetic disks, thumb drives, and smart cards that are inserted into a drive for transfer onto another computer readable storage medium that is also part of storage 710.

Figure 8:
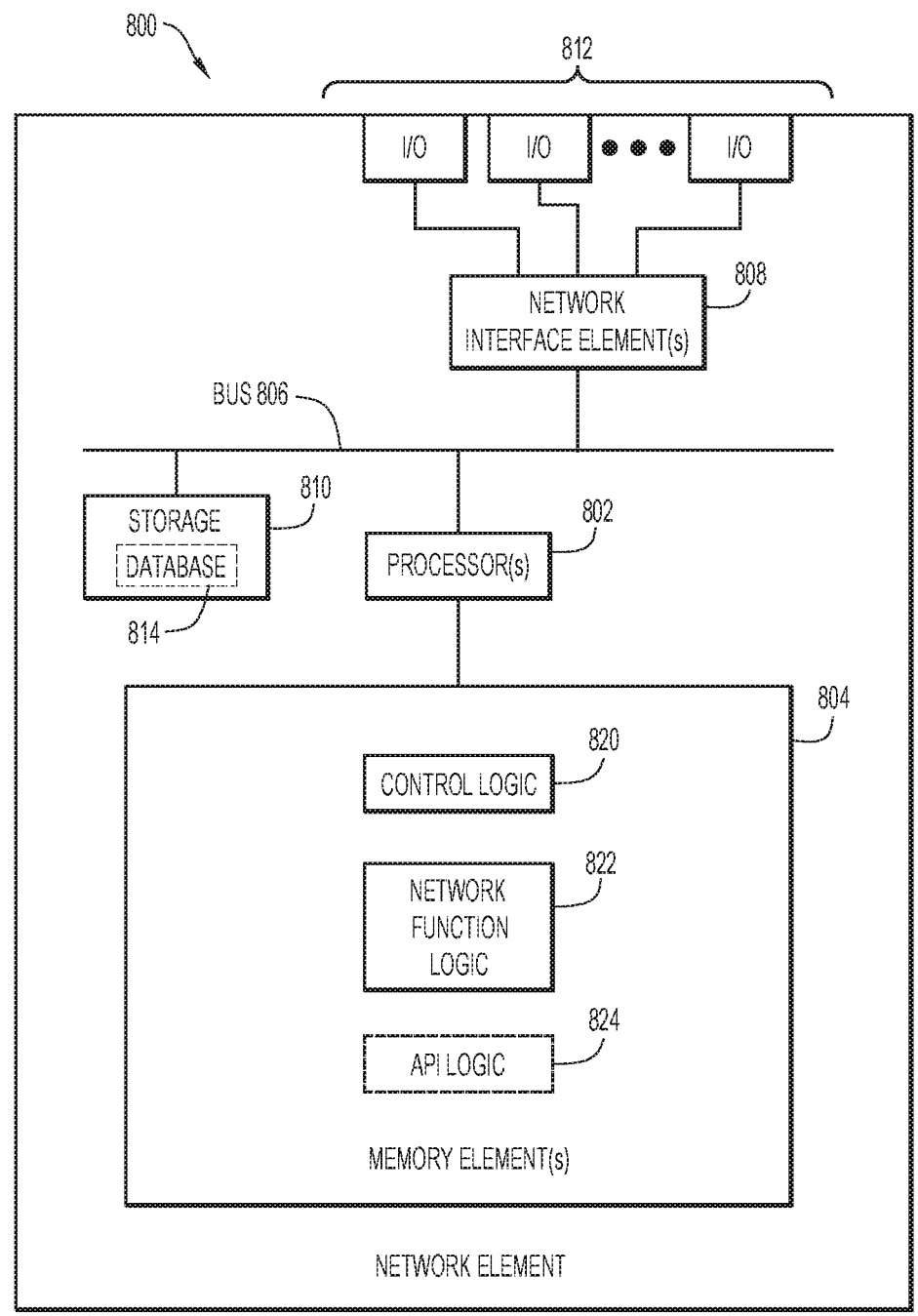
FIG. 8 is a simplified block diagram illustrating example details associated with a network element for implementing operations described herein, according to an example embodiment.

Referring to FIG. 8, FIG. 8 is a simplified block diagram illustrating example details associated with a network element 800 for implementing operations described herein, according to an example embodiment. In at least one embodiment, network element 800 may facilitate operations associated with any mobile network functions that may be instantiated and operated within a mobile network such as, for example, any mobile network functions 222 of 3GPP mobile network 210, as illustrated in the embodiment of FIG. 2.

The embodiment of FIG. 8 illustrates network element 800, which includes one or more processor(s) 802, one or more memory element(s) 804, a bus 806, one or more network interface element(s) 808, and storage 810. Memory element(s) 804 may include instructions for control logic 820 and network function logic 822. In at least one embodiment, memory element(s) 804 may additionally include instructions for API logic 824. In at least one embodiment, storage 810 may include a database 814 for information that may be stored and/or utilized by network element 800.

In at least one embodiment, processor(s) 802 is/are at least one hardware processor configured to execute various tasks, operations, and/or functions for network element 800 as described herein according to software and/or instructions configured for network element 800. In at least one embodiment, memory element(s) 804 is/are configured to store data, information, software and/or instructions associated with network element 800 and logic configured for memory element(s) 804. In at least one embodiment, bus 806 can be configured as an interface that enables one or more elements of network element 800 (e.g., network interface element(s) 808, processor(s) 802, memory element(s) 804 (and logic, applications, etc. configured therein), etc. to communicate in order to exchange information and/or data, to perform operations, etc. In at least one embodiment, a fast kernel-hosted interconnect may be employed for network element 800, potentially using shared memory between processes (e.g., logic, etc.), which can enable efficient communication paths between the processes.

In various embodiments, network interface element(s) 808 enables communications (wired or wireless) between network element 800 and other network elements or nodes, via one or more input/output (I/O) elements 812 (e.g., ports, transceivers, etc.) at which data, information, etc. is received and transmitted to facilitate operations discussed for various embodiments described herein. In some embodiments, network interface element(s) 808 can be configured with one or more Ethernet driver(s) and/or controller(s), one or more Fibre Channel (FC) driver(s) and/or controllers, one or more Radio Frequency (RF) driver(s) and/or controllers (e.g., for WiFi or any other unlicensed spectrum communications, for 3GPP or any other licensed spectrum communications, and/or or any other similar network interface driver(s) and/or controller(s) to enable communications for network element 800 within a communication system. Network element 800 can include any suitable interfaces for receiving, transmitting, and/or otherwise communicating data and/or information in a network environment.

In various embodiments, storage 810 can be configured to store data, information and/or instructions associated with network element 800 and/or logic configured for memory element(s) 804. Note that in certain examples, 810 can be consolidated with memory elements 804 (or vice versa), and/or the storage/memory elements can overlap/exist in any other suitable manner.

In various embodiments, control logic 820 can include instructions that, when executed (e.g., by processor(s) 802) cause network element 800 to perform operations, which can include, but not be limited to: performing control, management, etc. operations associated with network element 800; cooperating and/or interacting with other logic (internal and/or external to network element 800); maintaining and/or interacting with stored data, information, parameters; combinations thereof; and/or the like to facilitate various operations as discussed for various embodiments described herein.

In various embodiments, network function logic 822 can include instructions that, when executed (e.g., by processor(s) 1102) cause network element 800 to perform operations that may be associated with one or more network element(s) associated with one or more enterprise slices (e.g., any UPFs, SMFs, AMFs, PCFs, PGW-Cs, SGW-Cs, PGW-Us, SGW-Us MMEs, PCRFs, and/or any other 3GPP network elements that may be associated with a 3GPP mobile network); cooperating and/or interacting with other logic (internal and/or external to network element 800); maintaining and/or interacting with stored data, information, parameters; combinations thereof; and/or the like to facilitate various operations as discussed for various embodiments described herein.

In various embodiments, API logic 824 may include instructions that, when executed (e.g., by processor(s) 802) may facilitate various operations including, but not limited to: receiving/transmitting API procedure calls via API logic configured for an API-GW to facilitate the exchange of data and/or information and/or to perform various operations that may be associated with one or more location-based enterprise policies; cooperating and/or interacting with other logic (internal and/or external to network element 800); maintaining and/or interacting with stored data, information, parameters; combinations thereof; and/or the like to facilitate various operations as discussed for various embodiments described herein In various embodiments, memory element(s) 804 may include any suitable memory element such as RAM, DRAM, SRAM, and/or cache memory. In general, memory element(s) 804 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 810 may include any suitable storage such as persistent storage, which may be a magnetic disk drive, a solid state hard drive, a semiconductor storage device, ROM, an EPROM, flash memory, or any other computer readable storage media, which may be inclusive of non-transitory tangible media and/or non-transitory computer readable storage media, that is capable of storing program/logic/software instructions and/or digital information. In some embodiments, the media used by storage 810 may also be removable. For example, a removable hard drive may be used for storage 810. Other examples include optical and magnetic disks, thumb drives, and smart cards that are inserted into a drive for transfer onto another computer readable storage medium that is also part of storage 810.

Figure 9:
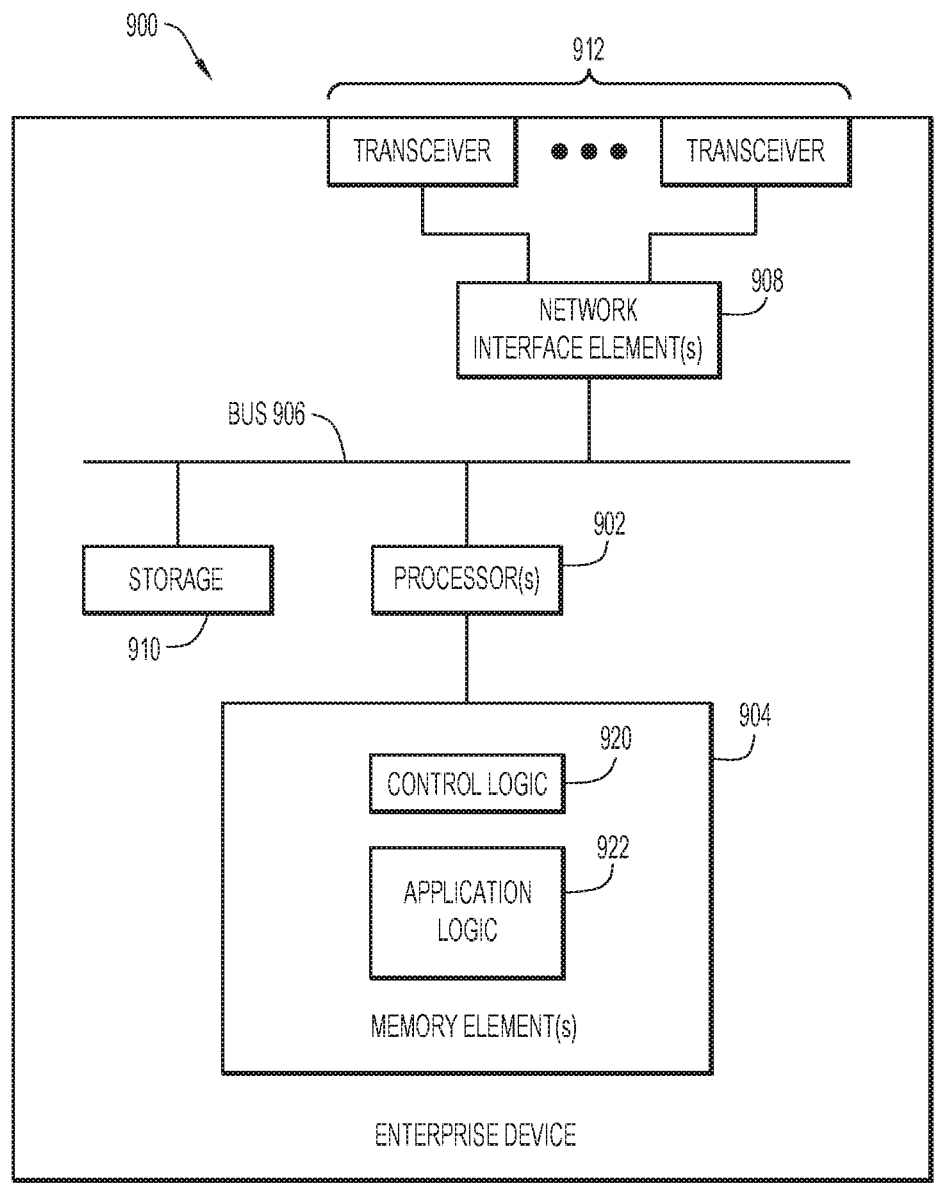
FIG. 9 is a simplified block diagram illustrating example details associated with an enterprise device for implementing operations described herein, according to an example embodiment.

Referring to FIG. 9, FIG. 9 is a simplified block diagram illustrating example details associated with an enterprise device 900 for implementing operations described herein, according to an example embodiment. In at least one embodiment, enterprise device 900 may facilitate operations associated with any enterprise device, such as enterprise device 116 as illustrated in the embodiment of FIG. 1 and enterprise device 256 as illustrated in the embodiment of FIG. 2.

The embodiment of FIG. 9 illustrates enterprise device 900, which includes one or more processor(s) 902, one or more memory element(s) 904, a bus 906, one or more network interface element(s) 908, and storage 910. Memory element(s) 904 may include instructions for control logic 920 and application logic 922.

In various embodiments, enterprise device 900 may be capable of performing over-the-air RF communications for WiFi accesses, 4G accesses and/or 5G SA/NSA accesses. In some embodiments, enterprise device 900 may also be capable of performing over-the-air communications for other communications standards such as 3GPP 2G and/or 3G accesses, WiMax, IEEE Standard 802.16™-2012, published Aug. 17, 2012, Radio-frequency Identification (RFID), Near Field Communication (NFC), Bluetooth™, etc.

In at least one embodiment, processor(s) 902 is/are at least one hardware processor configured to execute various tasks, operations, and/or functions for enterprise device 900 as described herein according to software and/or instructions configured for enterprise device 900. In at least one embodiment, memory element(s) 904 is/are configured to store data, information, software and/or instructions associated with enterprise device 900 and logic configured for memory element(s) 804. In at least one embodiment, bus 906 can be configured as an interface that enables one or more elements of enterprise device 900 (e.g., network interface element(s) 908, processor(s) 902, memory element(s) 904 (and logic configured therein), etc. to communicate in order to exchange information and/or data. In at least one embodiment, a fast kernel-hosted interconnect may be employed for enterprise device 900, potentially using shared memory between processes, which can enable efficient communication paths between the processes. In various embodiments, network interface element(s) 908 enable communications between enterprise device 900 and other network elements, via one or more transceivers 912 (e.g., receive and transmit units) at which traffic is received and transmitted to facilitate operations discussed for various embodiments described herein. Network interface element(s) 908 can be configured with one or more radio access network interface driver(s) and/or controller(s) to enable communications for enterprise device 900 within a 3GPP mobile network and/or any other network, such as a WiFi network (e.g., an enterprise WiFi network), etc. Enterprise device 900 can include any suitable interfaces for receiving, transmitting, and/or otherwise communicating data or information in a network environment.

In various embodiments, storage 910 can be configured to store data, data structures, databases, information, instructions, and/or the like associated with enterprise device 900 and/or logic configured for memory element(s) 904. Note that in certain examples, storage 910 can be consolidated with memory elements 904 (or vice versa), and/or the storage/memory elements can overlap/exist in any other suitable manner.

In at least one embodiment, control logic 920 can include instructions that, when executed (e.g., by processor(s) 902), cause enterprise device 900 to perform operations, which can include, but not be limited to providing control and/or management operations for enterprise device 900; cooperating and/or interacting with other logic; maintaining and/or interacting with stored data, information, parameters (e.g., memory element(s), storage, data structures, databases, tables, etc.); reporting detected enterprise SSIDs; sending notifications based on detected enterprise SSIDs, receiving and applying one or more location-based enterprise policies for modifying behaviors/operations of one or more applications operating on enterprise device 900; cooperating and/or interacting with other logic (internal and/or external to enterprise device 900); maintaining and/or interacting with stored data, information, parameters (e.g., memory element(s), storage, data structures, databases, tables, etc.); combinations thereof; and/or the like to facilitate any operations as discussed for various embodiments described herein.

In at least one embodiment, application logic 922 can include instructions that, when executed (e.g., by processor(s) 902), cause enterprise device 900 to perform operations, which can include, but not be limited to providing control and/or management operations for one or more applications operating on enterprise device 900; receiving and applying one or more mobile network policies for modifying behaviors/operations of one or more applications of enterprise device 900; cooperating and/or interacting with other logic (internal and/or external to enterprise device 900); maintaining and/or interacting with stored data, information, parameters (e.g., memory element(s), storage, data structures, databases, tables, etc.); combinations thereof; and/or the like to facilitate any operations as discussed for various embodiments described herein.

In various embodiments, memory element(s) 904 may include any suitable memory element such as RAM, DRAM, SRAM, and/or cache memory. In general, memory element(s) 904 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 910 may include any suitable storage such as persistent storage, which may be a magnetic disk drive, a solid state hard drive, a semiconductor storage device, ROM, EPROM, flash memory, and/or any other computer readable storage media, which may be inclusive of non-transitory tangible media and/or non-transitory computer readable storage media, that is capable of storing program/logic/software instructions and/or digital information. In some embodiments, the media used by storage 910 may also be removable. For example, a removable hard drive may be used for storage 910. Other examples include optical and magnetic disks, thumb drives, and smart cards that are inserted into a drive for transfer onto another computer readable storage medium that is also part of storage 910.

In summary, embodiments herein provide techniques in which proximity of an enterprise device to an enterprise site while the enterprise device is registered on a 3GPP mobile cellular network can be inferred by a combination of macro cellular location plus an indication of nearby enterprise connectivity, (e.g., detection of enterprise WiFi SSIDs). Thus, using techniques provided by embodiments herein, consistent enterprise policy application across enterprise devices that is dependent on enterprise site proximity may be possible while an enterprise device is connected via 3GPP macro-cellular technology.

In one form, a computer-implemented method is provided comprising: provisioning a location-based enterprise policy within a 3rd Generation Partnership Project (3GPP) mobile network, wherein the location-based enterprise policy comprises one or more mobile network policies configured by an enterprise and the location-based enterprise policy is associated with at least one enterprise device and at least one enterprise site of the enterprise; determining, via the 3GPP mobile network, that the at least one enterprise device is proximate to the at least one enterprise site; and activating, via the 3GPP mobile network, the one or more mobile network policies of the location-based enterprise policy based on the at least one enterprise device being proximate to the at least one enterprise site. The provisioning may include provisioning the location-based enterprise policy for a policy server within the 3GPP mobile network.

In one form, one or more non-transitory computer readable storage media encoded with instructions are provided. In at least one embodiment, the instructions, when executed by a processor, cause the processor to perform operations, comprising: provisioning a location-based enterprise policy within a 3rd Generation Partnership Project (3GPP) mobile network, wherein the location-based enterprise policy comprises one or more mobile network policies configured by an enterprise and the location-based enterprise policy is associated with at least one enterprise device and at least one enterprise site of the enterprise; determining, via the 3GPP mobile network, that the at least one enterprise device is proximate to the at least one enterprise site; and activating, via the 3GPP mobile network, the one or more mobile network policies of the location-based enterprise policy based on the at least one enterprise device being proximate to the at least one enterprise site.

In one form a system is provided. In at least one embodiment, the system may include at least one memory element for storing data; and at least one processor for executing instructions associated with the data, wherein executing the instructions causes the system to perform operations, comprising: provisioning a location-based enterprise policy within a 3rd Generation Partnership Project (3GPP) mobile network, wherein the location-based enterprise policy comprises one or more mobile network policies configured by an enterprise and the location-based enterprise policy is associated with at least one enterprise device and at least one enterprise site of the enterprise; determining, via the 3GPP mobile network, that the at least one enterprise device is proximate to the at least one enterprise site; and activating, via the 3GPP mobile network, the one or more mobile network policies of the location-based enterprise policy based on the at least one enterprise device being proximate to the at least one enterprise site.

The operations described herein may be identified based upon the application for which they are implemented in a specific embodiment. However, it should be appreciated that any particular operation nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer, compute node, or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Note that in certain example implementations, operations as outlined herein may be implemented by logic encoded in one or more tangible media, which may be inclusive of non-transitory tangible media and/or non-transitory computer readable storage media (e.g., embedded logic provided in an application specific integrated circuit (ASIC), in digital signal processing (DSP) instructions, software [potentially inclusive of object code and source code] to be executed by a processor, or other similar machine, etc.). In some of these instances, a memory element or storage can store data used for operations described herein. This includes memory elements or storage being able to store software, logic, code, and/or processor instructions that are executed to carry out operations described herein. A processor (e.g., a hardware processor) can execute any type of instructions associated with data to achieve the operations detailed herein. In one example, a processor may transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM), or an ASIC that includes digital logic, software, code, electronic instructions, or any suitable combination thereof.

In one example implementation, a compute node or a network element can encompass network appliances, routers, servers, switches, gateways, bridges, load balancers, firewalls, processors, modules, or any other suitable device, component, element, or object operable to exchange information that facilitates or otherwise helps to facilitate various operations as described for various embodiments discussed herein in a network environment (e.g., for systems and/or networks such as those presented herein).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

Elements and/or systems discussed for various embodiments described herein can couple to one another through simple interfaces (as illustrated) and/or through any other suitable connection (wired or wireless), which provides a viable pathway for network communications. As referred to herein, a physical (wired or wireless) interconnection or interface can refer to an interconnection of one element with one or more other element(s), while a logical interconnection or interface can refer to communications, interactions and/or operations of elements with each other, which can be directly or indirectly interconnected, in a network environment. Additionally, any one or more of the elements and/or systems may be combined or removed from a given deployment based on a particular configuration and/or implementation.

In various embodiments, systems and/or networks discussed herein may implement user datagram protocol/Internet Protocol (UDP/IP) connections and/or transmission control protocol/IP (TCP/IP) communication language protocol in particular embodiments of the present disclosure. However, systems and/or networks discussed herein can alternatively implement any other suitable communication protocol, interface and/or standard, proprietary and/or non-proprietary, for transmitting and receiving messaging and/or signaling. Other protocols, interfaces and/or communication standards that can be used in systems and/or networks discussed herein can include 3GPP Diameter-based protocols, Remote Authentication Dial-In User Service (RADIUS) protocols, Authentication, Authorization and Accounting (AAA) signaling, a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), API-based (e.g., via API 236), combinations thereof or the like. In some embodiments, secure communications can be facilitated using TCP/IP Secure Sockets Layer (SSL) communications.

In various embodiments, systems and/or networks discussed herein can represent a series of points or elements of interconnected communication paths (wired or wireless) for receiving and transmitting packets of information that propagate through the systems and/or networks. In various embodiments, systems and/or networks can be associated with and/or provided by a single network operator or service provider and/or multiple network operators or service providers. In various embodiments, systems and/or networks can include and/or overlap with, in whole or in part, one or more packet data network(s). Systems and/or networks presented herein may offer communicative interfaces between various elements of the systems and/or networks and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment A mobile network, such as mobile networks presented herein, through which communications propagate in can use any suitable technologies for communication including wireless (e.g., 3G/4G/5G/nG network, Institute of Electrical and Electronics Engineers (IEEE) Standard 802.11™-2012, published Mar. 29, 2012 (e.g., WiFi), WiMax, IEEE Standard 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

Note that in this disclosure, references to various features (e.g., elements, structures, nodes, modules, components, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein this Specification, can be inclusive of an executable file comprising instructions that can be understood and processed on a computer, processor, machine, compute node, combinations thereof, or the like and may further include library modules loaded during execution, object files, system files, hardware logic, software logic, and/or any other executable modules.

The embodiments presented may be implemented in various forms, such as a system, a method, and/or a computer program product at any possible technical detail level of integration. The computer program product may include a non-transitory computer readable storage medium (or media) having computer readable program instructions thereon for causing a processor to carry out aspects of operations presented herein.

It is also important to note that the operations and steps described with reference to the preceding FIGs. illustrate only some of the possible scenarios that may be executed by, or within, a communication system/mobile network/enterprise network. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interactions may be described in terms of one, two, three, or four elements. However, this has been done for purposes of clarity and example only. In certain cases, it may be easier to describe one or more of the functionalities by only referencing a limited number of network elements. It should be appreciated that networks discussed herein (and their teachings) are readily scalable and can accommodate a large number of components, as well as more complicated/sophisticated arrangements and configurations. Accordingly, the examples provided should not limit the scope or inhibit the broad teachings of networks discussed herein as potentially applied to a myriad of other architectures.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols, networks discussed herein may be applicable to other exchanges or routing protocols, interfaces, and/or communications standards, proprietary and/or non-proprietary. Moreover, although networks described herein have been illustrated with reference to particular elements and operations that facilitate processes, these elements, and operations may be replaced by any suitable architecture or process that achieves the intended functionality of networks described herein.

What is claimed is:

1. A method comprising:
authorizing, by a service provider operating a 3rd Generation Partnership Project (3GPP) mobile network, an enterprise to access and configure one or more mobile network policies of a plurality of mobile network policies enforceable within the 3GPP mobile network, wherein the authorizing comprises receiving, at a gateway of the 3GPP mobile network, one or more credentials from the enterprise, which one or more credentials authorize the enterprise to access and configure the one or more mobile network policies to provide a location-based enterprise policy for the 3GPP mobile network;
provisioning the location-based enterprise policy within the 3GPP mobile network, wherein the location-based enterprise policy comprises the one or more mobile network policies configured by the enterprise and the location-based enterprise policy is associated with at least one enterprise device and at least one enterprise site of the enterprise;
determining, via the 3GPP mobile network, that the at least one enterprise device is proximate to the at least one enterprise site; and
activating, via the 3GPP mobile network, the one or more mobile network policies of the location-based enterprise policy based on the at least one enterprise device being proximate to the at least one enterprise site.

2. The method of claim 1, wherein the provisioning further comprises:
provisioning the location-based enterprise policy for a policy server within the 3GPP mobile network.

3. The method of claim 1, wherein determining that the enterprise device is proximate to the at least one enterprise site further comprises:
receiving a notification from the enterprise device comprising one or more enterprise service set identifiers (SSIDs) detected by the enterprise device; and
determining that at least one of the one or more enterprise SSIDs is associated with the location-based enterprise policy.

4. The method of claim 1, wherein determining that the enterprise device is proximate to the at least one enterprise site further comprises:
receiving a notification from the enterprise device comprising an indication that the enterprise device has detected one or more enterprise service set identifiers (SSIDs); and
determining that the enterprise device is assigned to the location-based enterprise policy.

5. The method of claim 1, wherein the one or more mobile network policies comprise one or more of:
a cellular data limit rule to be applied to a session of the enterprise device when the enterprise device is proximate to the at least one enterprise site;
a cellular throughput limit rule to be applied to a session of the enterprise device when the enterprise device is proximate to the at least one enterprise site;
a threat protection rule to be applied to a session of the enterprise device when the enterprise device is proximate to the at least one enterprise site; and
a sleep/awake cycle rule to be applied to a session of the enterprise device when the enterprise device is proximate to the at least one enterprise site.

6. The method of claim 1, wherein activating the one or more mobile network policies of the location-based enterprise policy further comprises:
sending a notification to the enterprise device for triggering activation of at least one mobile network policy for one or more applications of the enterprise device.

7. The method of claim 6, wherein triggering activation of the at least one mobile network policy for the one or more applications of the enterprise device further comprises modifying operations of at least one application of the enterprise device.

8. The method of claim 1, further comprising:
notifying the enterprise that the enterprise device is proximate to the at least one enterprise site.

9. The method of claim 8, further comprising:
receiving enterprise inputs associated with updating at least one mobile network policy of the one or more mobile network policies based on the notifying; and
updating the at least one of the one or more mobile network policies based on the enterprise inputs.

10. The method of claim 1, further comprising:
monitoring a location of the enterprise device in proximity to the at least one enterprise site following the activating.

11. The method of claim 10, further comprising:
determining that the enterprise device is not proximate to the at least one enterprise site; and
deactivating the one or more mobile network policies of the location-based enterprise policy.

12. One or more non-transitory computer readable storage media encoded with instructions that, when executed by a processor, cause the processor to perform operations, comprising:
authorizing, by a service provider operating a 3rd Generation Partnership Project (3GPP) mobile network, an enterprise to access and configure one or more mobile network policies of a plurality of mobile network policies enforceable within the 3GPP mobile network, wherein the authorizing comprises receiving, at a gateway of the 3GPP mobile network, one or more credentials from the enterprise, which one or more credentials authorize the enterprise to access and configure the one or more mobile network policies to provide a location-based enterprise policy for the 3GPP mobile network;
provisioning the location-based enterprise policy within the 3GPP mobile network, wherein the location-based enterprise policy comprises the one or more mobile network policies configured by the enterprise and the location-based enterprise policy is associated with at least one enterprise device and at least one enterprise site of the enterprise;
determining, via the 3GPP mobile network, that the at least one enterprise device is proximate to the at least one enterprise site; and
activating, via the 3GPP mobile network, the one or more mobile network policies of the location-based enterprise policy based on the at least one enterprise device being proximate to the at least one enterprise site.

13. The media of claim 12, wherein determining that the enterprise device is proximate to the at least one enterprise site further comprises:
receiving a notification from the enterprise device comprising one or more enterprise service set identifiers (SSIDs) detected by the enterprise device; and
determining that at least one of the one or more enterprise SSIDs is associated with the location-based enterprise policy.

14. The media of claim 12, wherein determining that the enterprise device is proximate to the at least one enterprise site further comprises:
receiving a notification from the enterprise device comprising an indication that the enterprise device has detected one or more enterprise service set identifiers (SSIDs); and
determining that the enterprise device is assigned to the location-based enterprise policy.

15. The media of claim 12, wherein activating the one or more mobile network policies of the location-based enterprise policy further comprises:
sending a notification to the enterprise device for triggering activation of at least one mobile network policy for one or more applications of the enterprise device.

16. The media of claim 15, wherein triggering activation of the at least one mobile network policy for the one or more applications of the enterprise device further comprises modifying operations of at least one application of the enterprise device.

17. A system comprising:
at least one memory element for storing data; and
at least one processor for executing instructions associated with the data, wherein executing the instructions causes the system to perform operations, comprising:
- authorizing, by a service provider operating a 3rd Generation Partnership Project (3GPP) mobile network, an enterprise to access and configure one or more mobile network policies of a plurality of mobile network policies enforceable within the 3GPP mobile network, wherein the authorizing comprises receiving, at a gateway of the 3GPP mobile network, one or more credentials from the enterprise, which one or more credentials authorize the enterprise to access and configure the one or more mobile network policies to provide a location-based enterprise policy for the 3GPP mobile network;
- provisioning the location-based enterprise policy within the 3GPP mobile network, wherein the location-based enterprise policy comprises the one or more mobile network policies configured by the enterprise and the location-based enterprise policy is associated with at least one enterprise device and at least one enterprise site of the enterprise;
- determining, via the 3GPP mobile network, that the at least one enterprise device is proximate to the at least one enterprise site; and
- activating, via the 3GPP mobile network, the one or more mobile network policies of the location-based enterprise policy based on the at least one enterprise device being proximate to the at least one enterprise site.

18. The system of claim 17, wherein determining that the enterprise device is proximate to the at least one enterprise site further comprises:
- receiving a notification from the enterprise device comprising one or more enterprise service set identifiers (SSIDs) detected by the enterprise device; and
- determining that at least one of the one or more enterprise SSIDs is associated with the location-based enterprise policy.

19. The system of claim 17, wherein determining that the enterprise device is proximate to the at least one enterprise site further comprises:
- receiving a notification from the enterprise device comprising an indication that the enterprise device has detected one or more enterprise service set identifiers (SSIDs); and
- determining that the enterprise device is assigned to the location-based enterprise policy.

20. The system of claim 17, wherein activating the one or more mobile network policies of the location-based enterprise policy further comprises:
- sending a notification to the enterprise device for triggering activation of at least one mobile network policy for one or more applications of the enterprise device.

* * * * *